(12) United States Patent
Ji et al.

(10) Patent No.: US 12,284,656 B2
(45) Date of Patent: Apr. 22, 2025

(54) SEARCH SPACE ALLOCATION METHOD, SEARCH SPACE CONFIGURATION METHOD, AND RELATED DEVICE

(71) Applicant: VIVO MOBILE COMMUNICATION CO., LTD., Guangdong (CN)

(72) Inventors: Zichao Ji, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 365 days.

(21) Appl. No.: 17/658,596

(22) Filed: Apr. 8, 2022

(65) Prior Publication Data

US 2022/0240229 A1    Jul. 28, 2022

Related U.S. Application Data

(63) Continuation of application No. PCT/CN2020/119894, filed on Oct. 9, 2020.

(30) Foreign Application Priority Data

Oct. 10, 2019    (CN) .......................... 201910959991.9

(51) Int. Cl.
*H04W 72/23*    (2023.01)
(52) U.S. Cl.
CPC .................. *H04W 72/23* (2023.01)
(58) Field of Classification Search
CPC ..................................................... H04W 72/23
See application file for complete search history.

(56) References Cited

U.S. PATENT DOCUMENTS

| 2018/0098308 A1 | 4/2018 | Sun et al. |
| 2019/0191360 A1 | 6/2019 | Sun et al. |
| 2019/0335425 A1* | 10/2019 | Seo ................ H04L 5/0053 |
| 2021/0067268 A1* | 3/2021 | Seo .................. H04L 25/0238 |

FOREIGN PATENT DOCUMENTS

| CN | 109792355 A | 5/2019 |
| CN | 109802789 A | 5/2019 |
| CN | 110167036 A | 8/2019 |
| WO | 2019/056164 A1 | 3/2016 |
| WO | 2019/021489 A | 1/2019 |

(Continued)

OTHER PUBLICATIONS

Interdigital, Inc., "On DL and UL Beam Management", 3GPP TSG RAN WG1 Meeting NR#3, R1-1716468, (Sep. 21, 2017) 9 pages.

(Continued)

*Primary Examiner* — Joseph A Bednash
(74) *Attorney, Agent, or Firm* — Price Heneveld LLP

(57) ABSTRACT

The present disclosure provides a search space allocation method, a search space configuration method, and a related device. The method includes: in a case that a TRP is configured for a terminal device, discarding part search spaces configured for the terminal device if a quantity of first monitoring objects in a search space set configured for the terminal device exceeds a limit of first monitoring objects that can be monitored by the terminal device, where the first monitoring object includes a PDCCH candidate or a non-overlapping CCE.

17 Claims, 4 Drawing Sheets

In a case that a TRP is configured for a terminal device, discard some search spaces configured for the terminal device if a quantity of first monitoring objects in a search space set configured for the terminal device exceeds a limit of first monitoring objects that can be monitored by the terminal device — 301

(56) References Cited

FOREIGN PATENT DOCUMENTS

WO       2019/112209 A1    6/2019
WO       2019/143164 A1    7/2019

OTHER PUBLICATIONS

International Search Report from International Application No. PCT/CN2020/119894, mailed Jan. 4, 2021, 5 pages.
International Written Opinion from International Application No. PCT/CN2020/119894, mailed Jan. 4, 2021, 4 pages.
Chinese First Office Action for Chinese Application No. 201910959991.9, dated Aug. 29, 2022, 25 pages with translation.
European Extended Search Report and Opinion for European Application No. 20875459.8, dated Oct. 25, 2022, 12 pages.
Indian First Office Action for Indian Application No. 202217026802, dated Sep. 5, 2022, 5 pages with translation.
Huawei, Hisilicon, "PDCCH enhancements for URLLC", 3GPP TSG RAN WG1 Meeting #96bis, R1-1903954, Xi'an, China, Apr. 8- 12, 2019.
Qualcomm Incorporated, "PDCCH Enhancements for eURLLC", 3GPP TSG-RAN WG1 Meeting #98b, R1-1911118, Chongqing, China, Oct. 14-20, 2019.

\* cited by examiner

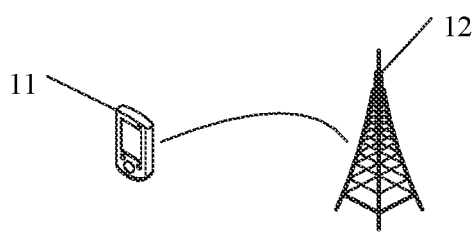
FIG. 2
In a case that a TRP is configured for a terminal device, discard some search spaces configured for the terminal device if a quantity of first monitoring objects in a search space set configured for the terminal device exceeds a limit of first monitoring objects that can be monitored by the terminal device — 301
FIG. 3
Configure a search space set for a terminal device — 401
FIG. 4
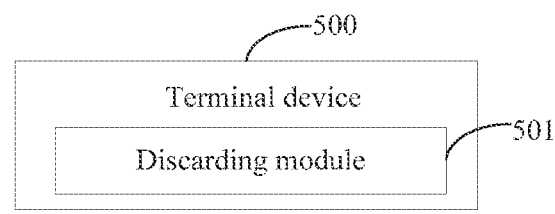
FIG. 5

SEARCH SPACE ALLOCATION METHOD, SEARCH SPACE CONFIGURATION METHOD, AND RELATED DEVICE

CROSS-REFERENCE TO RELATED APPLICATIONS

The present disclosure is a continuation of International Application No. PCT/CN2020/119894, filed on Oct. 9, 2020, which claims priority to Chinese Patent Application No. 201910959991.9, filed in China on Oct. 10, 2019, which are incorporated herein by reference in their entireties.

TECHNICAL FIELD

The present disclosure relates to the field of communications technologies, and in particular, to a search space allocation method, a search space configuration method, and a related device.

BACKGROUND

In a fifth-generation (5th-Generation, 5G) new radio (New Radio, NR) system of a fifteenth release (Release 15, Rel-15), resources of a physical downlink control channel (Physical Downlink Control Channel, PDCCH) can be flexibly allocated. A same PDCCH is no longer multiplexed by an entire cell, but a control resource set (Control Resource Set, CORESET) may be independently configured for each user equipment (User Equipment, UE) (also referred to as a terminal device) to monitor the PDCCH. The CORESET may include independent configuration information of a time domain resource, a frequency domain resource, and a space domain resource. In addition, in the 5G NR system, a plurality of search space sets can be configured for the UE, and a quantity of blind detections is flexibly configured for each search space (Search Space, SS). A CORESET and a search space set may be flexibly associated. Each CORESET may be associated with a plurality of search space sets, and resources of CORESETs of different UE may partially or completely overlap. To reduce implementation complexity of the UE, the NR system specifies a maximum quantity of PDCCH candidates (that is, a total quantity of blind detections) of the UE in a slot, and a limit (that is, a maximum quantity of channel estimates) of non-overlapping CCEs allocated to a PDCCH candidate monitored by the UE in a slot.

In addition, the 5G NR system may also support transmission of multiple transmission and reception point (Multiple Transmission and Reception Point, M-TRP) (also referred to as a transmission and reception point). To support transmitting a PDCCH by using a plurality of TRPs and a plurality of different beams (Beam), the UE needs to support configuration of more CORESETs, and an increase in a quantity of CORESETs may cause a total quantity of blind detections (that is, a total quantity of PDCCH candidates) of the UE in a slot to exceed a maximum quantity of supported PDCCH candidates, or a quantity of channel estimates to exceed a maximum quantity of channel estimates.

However, in the related art, there is no related solution to reduce a case that a total quantity of blind detections of UE exceeds a maximum quantity of supported PDCCH candidates or a quantity of channel estimates exceeds a maximum quantity of channel estimates in a system in which a TRP is configured.

SUMMARY

Embodiments of the present disclosure provide a search space allocation method, a search space configuration method, and a related device.

According to a first aspect of the present disclosure, a search space allocation method is provided. The method is applied to a terminal device and includes:
in a case that a transmission and reception point (TRP) is configured for the terminal device, discarding part search spaces configured for the terminal device if a quantity of first monitoring objects in a search space set configured for the terminal device exceeds a limit of first monitoring objects that can be monitored by the terminal device, where
the first monitoring object includes a physical downlink control channel (PDCCH) candidate or a non-overlapping control channel element (CCE).

According to a second aspect of the present disclosure, a search space configuration method is provided. The method is applied to a network side device and includes:
configuring a search space set for a terminal device, where a transmission and reception point (TRP) is configured for the terminal device; and a quantity of first monitoring objects in the search space set does not exceed a limit of first monitoring objects that can be monitored by the terminal device, or a quantity of first monitoring objects in a search space associated with a second transmission object in the search space set does not exceed a limit of first monitoring objects that can be monitored by the terminal device, or a quantity of first monitoring objects in a search space associated with a secondary cell SCell in the search space set does not exceed a limit of first monitoring objects that can be monitored by the terminal device; and
the first monitoring object includes a physical downlink control channel (PDCCH) candidate or a non-overlapping control channel element (CCE), the second transmission object includes a second TRP or a second control resource set (CORESET), the second TRP is a TRP other than a specific TRP in TRPs configured for the terminal device, the second CORESET is a CORESET other than a specific CORESET in a target CORESET, and the target CORESET is a CORESET configured for the terminal device to monitor a search space.

According to a third aspect of the present disclosure, a terminal device is provided. The terminal device includes:
a discarding module, configured to: in a case that a transmission and reception point (TRP) is configured for the terminal device, discard part search spaces configured for the terminal device if a quantity of first monitoring objects in a search space set configured for the terminal device exceeds a limit of first monitoring objects that can be monitored by the terminal device, where
the first monitoring object includes a physical downlink control channel (PDCCH) candidate or a non-overlapping control channel element (CCE).

According to a fourth aspect of the present disclosure, a network side device is provided. The network side device includes:
a configuration module, configured to configure a search space set for a terminal device, where
a transmission and reception point (TRP) is configured for the terminal device; and a quantity of first monitoring objects in the search space set does not exceed a limit of first monitoring objects that can be monitored by the terminal device, or a quantity of first monitoring objects in a search space associated with a second transmission object in the search space set does not exceed a limit of first monitoring objects that can be monitored by the terminal device, or a quantity of first monitoring objects in a search space associated with a secondary cell SCell in the search space set does not exceed a limit of first monitoring objects that can be monitored by the terminal device; and the first monitoring object includes a physical downlink control channel (PDCCH) candidate or a non-overlapping control channel element (CCE), the second transmission object includes a second TRP or a second control resource set (CORESET), the second TRP is a TRP other than a specific TRP in TRPs configured for the terminal device, the second CORESET is a CORESET other than a specific CORESET in a target CORESET, and the target CORESET is a CORESET configured for the terminal device to monitor a search space.

According to a fifth aspect of the present disclosure, a terminal device is provided, which includes a processor, a memory, and a computer program that is stored in the memory and that can be run on the processor, where when the computer program is executed by the processor, the steps of the search space allocation method provided in the first aspect are implemented.

According to a sixth aspect of the present disclosure, a network side device is provided, which includes a processor, a memory, and a computer program that is stored in the memory and that can be run on the processor, where when the computer program is executed by the processor, the steps of the search space configuration method provided in the second aspect are implemented.

According to a seventh aspect of the present disclosure, a computer-readable storage medium is provided, where the computer-readable storage medium stores a computer program, and when the computer program is executed by a processor, the steps of the search space allocation method provided in the first aspect or the steps of the search space configuration method provided in the second aspect are implemented.

In the embodiments of the present disclosure, in a case that a TRP is configured for the terminal device, some search spaces configured for the terminal device are discarded if a quantity of PDCCH candidates in a search space set configured for the terminal device exceeds a limit of PDCCH candidates that can be monitored by the terminal device or a quantity of non-overlapping CCEs in a search space set configured for the terminal device exceeds a limit of non-overlapping CCEs that can be monitored by the terminal device. In this way, a case that a total quantity of blind detections of UE exceeds a maximum quantity of supported PDCCH candidates or a quantity of channel estimates exceeds a maximum quantity of channel estimates can be reduced, and flexibility of allocating a PDCCH blind detection resource can be improved.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings without creative efforts.

FIG. 2 is a structural diagram of a network system to which the embodiments of the present disclosure can be applied;

FIG. 3 is a flowchart of a search space allocation method according to an embodiment of the present disclosure;

FIG. 4 is a flowchart of a search space allocation method according to still another embodiment of the present disclosure;

FIG. 5 is a structural diagram of a terminal device according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In the specification and claims of this application, the terms "first", "second", and the like are intended to distinguish between similar objects but do not necessarily describe a specific order or sequence. It should be understood that the data termed in such a way is interchangeable in proper circumstances so that the embodiments of this application described herein can be implemented, for example, in an order other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. In addition, in the specification and claims, "and/or" is used to indicate at least one of connected objects, for example, A and/or B and/or C, and to indicate seven cases: only A, only B, only C, A and B, B and C, A and C, and A, B and C.

For ease of understanding, the following describes some content in the embodiments of the present disclosure.

Figure 1A:
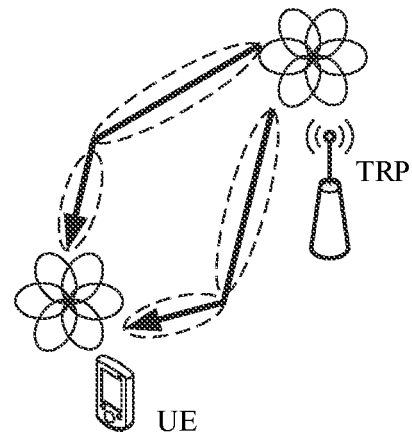
FIG. 1a is a schematic diagram of multi-antenna panel transmission in a same TRP according to an embodiment of the present disclosure.
Figure 1B:
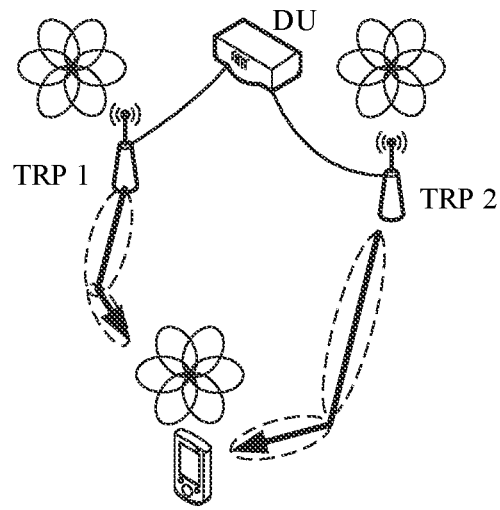
FIG. 1b is a schematic diagram of an ideal backhaul according to an embodiment of the present disclosure.
Figure 1C:
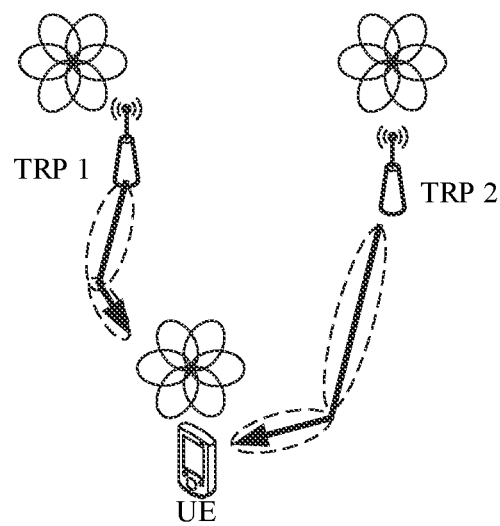
FIG. 1c is a schematic diagram of a non-ideal backhaul according to an embodiment of the present disclosure.

Multiple Transmission and Reception Point (M-TRP):

In the 3rd Generation Partnership Project (3rd Generation Partnership Project, 3GPP) Release 16 (Release 16, Rel-16), a multiple transmission and reception point/multi-antenna panel (multi-TRP/multi-Panel) scenario is proposed. Multi-TRP transmission can increase transmission reliability and throughput performance, for example, UE may receive same data or different data from a plurality of TRPs. Referring to FIG. 1a to FIG. 1c, the following several TRP transmission scenarios may be included.

(1) transmission of a multi-antenna panel in a same TRP;
(2) multi-TRP/panel transmission between a plurality of TRPs, including an ideal backhaul (Ideal Backhaul); and
(3) multi-TRP/panel transmission between a plurality of TRPs, including a non-ideal backhaul (Non-ideal Backhaul), where the multi-TRP transmission solution may include:

a plurality of TRPs sends a plurality of physical downlink control channels (Physical Downlink Control Channel, PDCCH) and a plurality of physical downlink shared channels (Physical Downlink Shared Channel, PDSCH), and each TRP sends one PDCCH and one PDSCH;

a plurality of PDSCHs transmit a same transport block (Transport Block, TB); and a plurality of PDSCHs transmit different TBs.

A UE PDCCH processing capability may be a maximum quantity of PDCCH candidates (that is, a maximum quantity of PDCCH candidates) that can be monitored by UE (which may also be referred to as a terminal device) in a unit of time (for example, a slot (Slot)), or a maximum quantity of non-overlapping control channel elements (Control Channel Element, CCE) allocated to a PDCCH candidate that can be monitored.

A TRP limit (TRP Limit) may represent a maximum processing capability of UE to monitor a PDCCH candidate that is associated with one TRP in one cell, for example, a maximum quantity of PDCCH candidates or a maximum quantity of non-overlapping CCEs that are associated with one TRP in one cell and that can be monitored by the UE.

A cell limit (Cell Limit) may represent a maximum processing capability of UE to monitor a PDCCH candidate in one cell, for example, a maximum quantity of PDCCH candidates or a maximum quantity of non-overlapping CCEs that can be monitored by the UE in one cell, where one or more TRPs may be configured in one cell.

A carrier aggregation (Carrier Aggregation, CA) limit (CA Limit) may represent a maximum processing capability of monitoring PDCCH candidates in a plurality of cells when carrier aggregation is configured for UE, for example, a maximum quantity of PDCCH candidates or a maximum quantity of non-overlapping CCEs that can be monitored by the UE in a case that CA is configured for the UE.

Overbooking (Overbooking) is configuring that a quantity of PDCCH candidates or a quantity of non-overlapping CCEs that are monitored by UE exceeds a maximum PDCCH candidate processing capability of the UE, for example, it is configured that a quantity of PDCCH candidates monitored by the UE exceeds a maximum quantity of PDCCH candidates that can be monitored by the UE, or it is configured that a quantity of non-overlapping CCEs monitored by the UE exceeds a maximum quantity of non-overlapping CCEs that can be monitored by the UE.

Overbooking processing may be discarding (also referred to as quitting allocation, quitting mapping, stopping allocation, or stopping mapping) some search spaces configured for UE in a case in which overbooking exists.

Referring to FIG. 2, FIG. 2 is a structural diagram of a network system to which embodiments of the present disclosure can be applied. As shown in FIG. 2, the network system includes a terminal device 11 and a network side device 12. The terminal device 11 may be a user side device such as a mobile phone, a tablet personal computer (Tablet Personal Computer), a laptop computer (Laptop Computer), a personal digital assistant (Personal Digital Assistant, PDA), a mobile internet device (Mobile Internet Device, MID), or a wearable device (Wearable Device). It should be noted that a specific type of the terminal device 11 is not limited in the embodiments of the present disclosure. The network side device 12 may be a base station, for example, a macro base station, a Long Term Evolution (Long Term Evolution, LTE) evolved node base station (evolved node base station, eNB), a 5G NR base station (node base station, NB), or a next generation node base station (next generation node base station, gNB). The network side device 12 may be alternatively a small cell, for example, a low power node (Low Power Node, LPN), a pico or a femto, or the network side device 12 may be an access point (Access Point, AP). The base station may be alternatively a network node formed by a central unit (Central Unit, CU) and a plurality of TRPs that are managed and controlled by the CU. It should be noted that a specific type of the network side device 12 is not limited in this embodiment of the present disclosure.

The terminal device 11 may be configured to perform the search space allocation method provided in this embodiment of the present disclosure, and the network side device 12 may be configured to perform the search space configuration method provided in this embodiment of the present disclosure.

An embodiment of the present disclosure provides a search space allocation method, applied to a terminal device. Referring to FIG. 3, FIG. 3 is a flowchart of a search space allocation method according to an embodiment of the present disclosure. As shown in FIG. 3, the method includes the following steps.

Step 301: In a case that a TRP is configured for the terminal device, discard part search spaces configured for the terminal device if a quantity of first monitoring objects in a search space set configured for the terminal device exceeds a limit of first monitoring objects that can be monitored by the terminal device.

The first monitoring object may include a PDCCH candidate (PDCCH Candidate) or a non-overlapping CCE.

In this embodiment, that a TRP is configured for the terminal device may include that at least two TRPs are configured for the terminal device. That a TRP is configured for the terminal device may include that a TRP is configured for a cell of the terminal device. For example, at least two TRPs are configured for a cell of the terminal device, or it may be understood that at least two TRPs are configured for the terminal device.

The limit of the first monitoring objects that can be monitored by the terminal device may be used to reflect a PDCCH processing capability of the terminal device. The limit of the first monitoring objects that can be monitored by the terminal device may include a limit of first monitoring objects that are of different granularities and that can be monitored by the terminal device, for example, one or more of a TRP, a cell, a CA, and a cell group.

It should be noted that comparing the quantity of first monitoring objects in the search space set configured for the terminal device with the limit of the first monitoring objects that can be monitored by the terminal device may be comparing the quantity of first monitoring objects in the search space set configured for the terminal device with a quantity of first monitoring objects at a same granularity in the limit of the first monitoring objects that can be monitored by the terminal device, for example, separately comparing a limit of first monitoring objects of each configured TRP with a limit of first monitoring objects of one TRP that can be monitored by the terminal device; separately comparing a limit of first monitoring objects of each configured cell with a limit of first monitoring objects of one cell that can be monitored by the terminal device; and comparing a limit of first monitoring objects of configured CA with a limit of first monitoring objects of the CA that can be monitored by the terminal device.

Optionally, in a case that a quantity of first monitoring objects in any configured granularity exceeds a limit of first monitoring objects that can be monitored by the terminal device in the granularity, it may be determined that the quantity of first monitoring objects in the search space set configured for the terminal device exceeds the limit of the first monitoring objects that can be monitored by the terminal device.

The discarding part search spaces configured for the terminal device may also be referred to as quitting allocating or quitting mapping or stopping mapping or stopping allocating some search spaces configured for the terminal device. The allocating (which may also be referred to as mapping) a search space may be understood as allocating a PDCCH candidate used to monitor a search space. Optionally, the discarding part search spaces configured for the terminal device may include discarding a search space associated with a specific TRP in TRPs configured for the terminal device, or discarding a search space associated with any TRP in TRPs configured for the terminal device.

According to the search space allocation method provided in this embodiment of the present disclosure, in a case that a TRP is configured for the terminal device, some search spaces configured for the terminal device are discarded if a quantity of PDCCH candidates in a search space set configured for the terminal device exceeds a limit of PDCCH candidates that can be monitored by the terminal device or a quantity of non-overlapping CCEs in a search space set configured for the terminal device exceeds a limit of non-overlapping CCEs that can be monitored by the terminal device, that is, it is configured that a quantity of PDCCH candidates or non-overlapping CCEs that are monitored by UE exceeds a maximum PDCCH candidate processing capability of the UE. In this way, a case that a total quantity of blind detections of UE exceeds a maximum quantity of supported PDCCH candidates or a quantity of channel estimates exceeds a maximum quantity of channel estimates can be reduced, and flexibility of allocating a PDCCH blind detection resource can be improved.

Optionally, the limit of the first monitoring objects that can be monitored by the terminal device may include at least one of the following:
 a TRP limit, where the TRP limit is a maximum quantity of first monitoring objects that are associated with one TRP in one cell and that can be monitored by the terminal device;
 a cell limit, where the cell limit is a maximum quantity of first monitoring objects that can be monitored by the terminal device in one cell;
 a CA limit, where the CA limit is a maximum quantity of first monitoring objects that can be monitored by the terminal device in a case that CA is configured for the terminal device; or
 a group limit, where the group limit is a maximum quantity of first monitoring objects that can be monitored by the terminal device in one group, and the group is obtained by grouping cells in which PDCCHs are monitored based on TRPs.

In this embodiment, the TRP limit (TRP Limit) may indicate a maximum processing capability of the terminal device to monitor a PDCCH candidate associated with one TRP in one cell. The TRP limit may include a maximum quantity of PDCCH candidates that are associated with one TRP in one cell and that can be monitored by the terminal device, or a maximum quantity of non-overlapping CCEs that are associated with one TRP in one cell and that can be monitored by the terminal device. For example, a monitoring object is a PDCCH candidate. If the TRP limit is 10, it indicates that the terminal device can monitor a maximum of 10 PDCCH candidates associated with one TRP in one cell. If a quantity of to-be-monitored PDCCH candidates allocated to a TRP in a cell exceeds 10, it indicates that the PDCCH processing capability of the terminal device is exceeded.

The cell limit (Cell Limit) may indicate a maximum processing capability of the terminal device to monitor a PDCCH candidate in one cell. The cell limit may include a maximum quantity of PDCCH candidates that can be monitored by the terminal device in one cell, or a maximum quantity of non-overlapping CCEs that can be monitored by the terminal device in one cell. For example, a monitoring object is a PDCCH candidate. If the cell limit is 20, it indicates that the terminal device can monitor a maximum of 20 PDCCH candidates in one cell. If a quantity of to-be-monitored PDCCH candidates allocated to a cell exceeds 20, it indicates that the PDCCH processing capability of the terminal device is exceeded.

The CA limit (CA Limit) may indicate a maximum processing capability of the terminal device to monitor PDCCH candidates in a plurality of cells in a case that CA is configured for the terminal device. The CA limit may include a maximum quantity of PDCCH candidates or a maximum quantity of non-overlapping CCEs that can be monitored by UE in a case that CA is configured for the terminal device. It should be noted that, in a case that CA is configured for the terminal device, PDCCH candidates may be allocated only to a part of a plurality of cells for monitoring, or a PDCCH candidate may be allocated to each of the plurality of cells for monitoring. For example, a monitoring object is a PDCCH candidate. If the CA limit is 20, it indicates that the terminal device can monitor a maximum of 20 PDCCH candidates in a case that CA is configured for the terminal device. If CA of two cells is configured for the terminal device, that is, a primary cell (Primary Cell, PCell) and a secondary cell (Secondary Cell, SCell), and a sum of a quantity of to-be-monitored PDCCH candidates allocated to the PCell and a quantity of to-be-monitored PDCCH candidates allocated to the SCell exceeds 20, it indicates that the PDCCH processing capability of the terminal device is exceeded.

The group limit (Group Limit) may indicate a maximum processing capability of the terminal device to monitor a PDCCH candidate in one group. The group limit may include a maximum quantity of PDCCH candidates that can be monitored by the terminal device in one group, or a maximum quantity of non-overlapping CCEs that can be monitored by the terminal device in one group. For example, a monitoring object is a PDCCH candidate. If the group limit is 15, it indicates that the terminal device can monitor a maximum of 15 PDCCH candidates in one group. If a quantity of to-be-monitored PDCCH candidates allocated to a group exceeds 15, it indicates that the PDCCH processing capability of the terminal device is exceeded.

The foregoing group may represent a TRP-based group of a cell in which a PDCCH is monitored. For example, if the PCell is associated with a TRP-1 and a TRP-2, and the SCell is associated with the TRP-1, a group corresponding to the TRP-1 may include the PCell and the SCell, and a group corresponding to the TRP-2 may include the PCell.

Optionally, the group limit may be a value configured on the network side, and the value does not exceed a maximum PDCCH processing capability reported by the UE.

Optionally, the discarding part search spaces configured for the terminal device may include:
   discarding part or all UE-specific search spaces (UE-specific Search Space, USS) associated with a first transmission object, where
   the first transmission object includes a first TRP or a first CORESET, the first TRP includes at least one TRP in TRPs configured for the terminal device, and the first CORESET includes at least one CORESET in CORESETs configured for the terminal device to monitor search spaces.

In this embodiment, the first TRP may be any TRP in the TRPs configured for the terminal device, or may be a specific TRP in the TRPs configured for the terminal device. Similarly, the first CORESET may be any CORESET in CORESETs configured for the terminal device to monitor search spaces, or may be a specific CORESET in CORESETs configured for the terminal device to monitor search spaces.

For example, in a case that at least two TRPs are configured for a cell of the terminal device, part or all USSs associated with a first TRP or a first CORESET may be discarded if the quantity of first monitoring objects in the search space set configured for the terminal device exceeds the limit of the first monitoring objects that can be monitored by the terminal device.

Optionally, the first TRP is a specific TRP in the TRPs configured for the terminal device, or the first CORESET is a specific CORESET in a target CORESET.

In this embodiment, in a case that at least two TRPs are configured for a cell of the terminal device, overbooking processing may be allowed to be performed only on a specific TRP (referred to as a P-TRP below). For example, it is determined whether overbooking exists only in a process of allocating a search space associated with the P-TRP, and allocation of part or all USSs associated with the P-TRP is quit in a case that overbooking exists, to ensure that a quantity of first monitoring objects in an allocated search space does not exceed a maximum processing capability of the terminal device to monitor a PDCCH candidate.

In this embodiment, part or all USSs associated with the specific TRP or the specific CORESET are quit, thereby reducing complexity of allocating a search space by the UE.

Optionally, the specific TRP may include at least one of the following:
   a TRP associated with a common search space (Common Search Space, CSS);
   a TRP associated with a specific downlink control information (Downlink control information, DCI) format;
   a TRP associated with a specific identifier or a specific index; or
   a TRP indicated or configured by a network side device.

In this embodiment, the foregoing specific DCI format may include a fallback DCI (fallback DCI) format, for example, a DCI format 0_0 or a DCI format 1_0.

The foregoing TRP associated with the specific identifier may include a TRP associated with a specific ID, for example, a TRP associated with a minimum or maximum TCI (Transmission Configuration Indication, transmission configuration indication) state ID, or a TRP whose ID is 0.

The foregoing TRP associated with the specific index (Index) is, for example, a TRP with a minimum index or a maximum index or an index of 0.

The foregoing TRP indicated by the network side device may be a TRP indicated by the network side device by using signaling such as DCI. The foregoing TRP configured by the network side device may be a TRP configured by the network side device by using signaling such as radio resource control (Radio Resource Control, RRC).

Optionally, the specific CORESET may include at least one of the following:
   a CORESET associated with a common search space (CSS);
   a CORESET associated with a specific DCI format;
   a CORESET associated with a specific identifier or a specific index;
   a CORESET indicated or configured by a network side device; or
   a CORESET associated with a specific TRP.

In this embodiment, the foregoing specific DCI format may include a fallback DCI (fallback DCI) format, for example, a DCI format 0_0 or a DCI format 1_0.

The foregoing CORESET associated with the specific identifier may include a CORESET associated with a specific ID, for example, a CORESET associated with a minimum or maximum TCI state ID, or a CORESET whose ID is 0. The foregoing CORESET associated with the specific index (Index) is, for example, a CORESET with a minimum index or a maximum index or an index of 0.

The foregoing CORESET indicated by the network side device may be a CORESET indicated by the network side device by using signaling such as DCI or RRC. The foregoing CORESET configured by the network side device may be a CORESET configured by the network side device by using signaling such as RRC.

Optionally, the foregoing specific TRP may include at least one of the following: a TRP associated with a CSS, a TRP associated with a specific DCI format, a TRP associated with a specific identifier or a specific index; or a TRP indicated or configured by a network side device. In this way, the specific CORESET may be determined based on the specific TRP.

Optionally, before the discarding part or all UE-specific search spaces (USSs) associated with a first transmission object, the method may further include:
   allocating a common search space (CSS) configured for the terminal device; and
   the discarding part or all UE-specific search spaces (USSs) associated with a first transmission object includes:
   sequentially allocating, in a first allocation sequence, USSs associated with the first transmission object; and
   discarding a first USS if a quantity of first monitoring objects that need to be monitored after the first USS is allocated exceeds the limit of the first monitoring objects that can be monitored by the terminal device, and discarding a second USS if the second USS exists, where
   the first USS is any USS associated with the first transmission object, and the second USS is a USS that is in the USSs associated with the first transmission object and that is allocated after the first USS.

In this embodiment, all CSSs configured for the terminal device may be first allocated, and then USSs associated with a first TRP or a first CORESET may be sequentially allocated in the first allocation sequence. The foregoing first allocation sequence may be an SS ID sequence of USSs, or may be an allocation sequence determined according to a preset rule.

Alternatively, if a quantity of first monitoring objects that need to be monitored by the terminal device after a USS associated with the first TRP or the first CORESET is allocated exceeds the limit of the first monitoring objects that can be monitored by the terminal device, for example, exceeds at least one of the TRP limit, the cell limit, or the CA limit, allocation of the USS and a USS to be allocated after the USS may be quit or stopped.

For example, if a quantity of PDCCH candidates that are associated with the first TRP and that need to be monitored by the terminal device after a USS associated with the first TRP is allocated exceeds the TRP limit, or a quantity of PDCCH candidates that are associated with a cell of the first TRP and that need to be monitored by the terminal device after a USS associated with the first TRP is allocated exceeds the cell limit, or a quantity of PDCCH candidates that need to be monitored by the terminal device after a USS associated with the first TRP is allocated exceeds the CA limit in a case that CA is configured for the terminal device, allocation of the USS and a USS to be allocated after the USS is quit or stopped.

For another example, the TRP limit=10, the TRP-1 is associated with a CSS (a quantity of to-be-monitored PDCCH candidates=4), a USS 1 (a quantity of to-be-monitored PDCCH candidates=4), and a USS 3 (a quantity of to-be-monitored PDCCH candidates=3), the TRP-2 is associated with a USS 2 (a quantity of to-be-monitored PDCCH candidates=4) and a USS 4 (a quantity of to-be-monitored PDCCH candidates=2), and the TRP-1 is a specific TRP. If a quantity of PDCCH candidates that are associated with the TRP-1 and that need to be monitored by the terminal device after the USS 3 of the TRP-1 is allocated is 11 and exceeds the TRP limit, allocation of the USS 3 is quit.

Optionally, the method may further include:
allocating all USSs associated with a second transmission object, where
the second transmission object includes a second TRP or a second CORESET, the second TRP is a TRP other than the first TRP in the TRPs configured for the terminal device, the second CORESET is a CORESET other than the first CORESET in the target CORESET, a configured first quantity does not exceed the limit of the first monitoring objects that can be monitored by the terminal device, and the first quantity is a quantity of first monitoring objects in USSs associated with the second transmission object.

In this embodiment, the network side may configure that the quantity of first monitoring objects associated with the second transmission object does not exceed the limit of the first monitoring objects that can be monitored by the terminal device, for example, does not exceed any one of the TRP limit, the cell limit, and the CA limit. In this way, a case that a total quantity of blind detections of UE exceeds a maximum quantity of supported PDCCH candidates or a quantity of channel estimates exceeds a maximum quantity of channel estimates can be avoided, complexity of allocating a search space by the UE can be reduced, and power consumption of the UE can be reduced.

It should be noted that the step of allocating all the USSs associated with the second transmission object may be performed before the step of sequentially allocating, in the first allocation sequence, the USSs associated with the first transmission object, or may be performed after the step of sequentially allocating, in the first allocation sequence, the USSs associated with the first transmission object, or may be performed in parallel with the step of sequentially allocating, in the first allocation sequence, the USSs associated with the first transmission object. This is not limited in this embodiment. In this way, the quantity of first monitoring objects associated with one cell that need to be monitored after the first USS is allocated may be a sum of a quantity of first monitoring objects of the allocated USS associated with the first transmission object and a quantity of first monitoring objects of all allocated CSSs.

In this embodiment of the present disclosure, the USS associated with the first transmission object and the USS associated with the second transmission object may be allocated in any sequence, so that flexibility of allocating a USS by the UE can be improved.

Optionally, a quantity of first monitoring objects in a search space allocated in one cell of the terminal device does not exceed a cell limit; and
the cell limit is a maximum quantity of first monitoring objects that can be monitored by the terminal device in one cell.

In this embodiment, after allocation of searching spaces is completed, a quantity of first monitoring objects in an allocated search space in a cell does not exceed the cell limit, that is, a quantity of first monitoring objects in an allocated search space associated with a cell does not exceed the cell limit.

Optionally, a quantity of first monitoring objects in a search space allocated in a case that carrier aggregation (CA) is configured for the terminal device does not exceed a CA limit; and
the CA limit is a maximum quantity of first monitoring objects that can be monitored by the terminal device in a case that CA is configured for the terminal device.

In this embodiment, if CA is configured for the terminal device, after allocation of searching spaces is completed, a quantity of first monitoring objects in search spaces allocated to a plurality of cells does not exceed the CA limit. For example, if CA of two cells is configured for the UE, that is, a PCell and a SCell, a sum of a quantity of first monitoring objects in an allocated search space associated with the PCell and a quantity of first monitoring objects in an allocated search space associated with the PCell does not exceed the CA limit.

It should be noted that, in this embodiment, based on configuration of search spaces on the network side and overbooking processing on the UE side, it may be jointly ensured that after allocation of searching spaces is completed, a quantity of first monitoring objects in an allocated search space in a cell does not exceed the cell limit and a quantity of first monitoring objects in an allocated search space in a case that carrier aggregation (CA) is configured for the terminal device does not exceed the CA limit.

Optionally, before the discarding part or all UE-specific search spaces (USSs) associated with a first transmission object, the method may further include:
allocating a common search space (CSS) configured for the terminal device; and
allocating all USSs associated with a third transmission object, where the third transmission object includes a third TRP or a third CORESET, the third TRP is a TRP other than the first TRP in the TRPs configured for the terminal device, the third CORESET is a CORESET other than the first CORESET in the target CORESET, the target CORESET is a CORESET configured for the terminal device to monitor a search space, a configured second quantity does not exceed the limit of the first monitoring objects that can be monitored by the terminal device, and the second quantity is a quantity of first monitoring objects in USSs associated with the third transmission object; and the discarding part or all UE-specific search spaces (USSs) associated with a first transmission object includes:

sequentially allocating, in a second allocation sequence, USSs associated with the first transmission object; and discarding a third USS if a quantity of first monitoring objects that need to be monitored after the third USS is allocated exceeds the limit of the first monitoring objects that can be monitored by the terminal device, and discarding a fourth USS if the fourth USS exists, where the third USS is any USS associated with the first transmission object, and the fourth USS is a USS that is in the USSs associated with the first transmission object and that is allocated after the third USS.

In this embodiment, the foregoing second allocation sequence may be an SS ID sequence of USSs, or may be an allocation sequence determined according to a preset rule. In addition, the network side may configure that the quantity of first monitoring objects in the USSs associated with the third transmission object does not exceed the limit of the first monitoring objects that can be monitored by the terminal device, for example, does not exceed any one of the TRP limit, the cell limit, and the CA limit. Optionally, the configured quantity of first monitoring objects in the USSs associated with the third transmission object does not exceed the TRP limit.

Alternatively, if a quantity of first monitoring objects that need to be monitored by the terminal device after a USS associated with the first TRP or the first CORESET is allocated exceeds the limit of the first monitoring objects that can be monitored by the terminal device, for example, exceeds at least one of the TRP limit, the cell limit, or the CA limit, allocation of the USS and a USS after the USS may be quit or stopped.

It should be noted that a quantity of first monitoring objects associated with a cell that need to be monitored after the first USS is allocated may be a sum of a quantity of first monitoring objects of the allocated USS associated with the first transmission object, a quantity of first monitoring objects of all allocated USSs associated with the first transmission object, and a quantity of first monitoring objects of all allocated CSSs.

In this embodiment, overbooking processing may be performed on USSs associated with the first transmission object. Therefore, all CSSs and all USSs associated with the third transmission object may be first allocated, and then USSs associated with the first transmission object are allocated. In this way, it can be ensured that a total quantity of blind detections of UE does not exceed a maximum quantity of supported PDCCH candidates or a quantity of channel estimates does not exceed a maximum quantity of channel estimates, and complexity of allocating a search space by the UE is reduced.

Optionally, before the discarding part or all UE-specific search spaces (USSs) associated with a first transmission object, the method furthers include:

allocating a CSS configured for the terminal device; and the discarding part or all UE-specific search spaces (USSs) associated with a first transmission object may include:

sequentially allocating, in a third allocation sequence, USSs associated with the TRPs configured for the terminal device; and discarding a fifth USS if a quantity of first monitoring objects that need to be monitored after the fifth USS is allocated exceeds the limit of the first monitoring objects that can be monitored by the terminal device, and discarding a sixth USS if the sixth USS exists, where the fifth USS is any USS associated with the TRPs configured for the terminal device, and the sixth USS is a USS that is in the USSs associated with the TRPs configured for the terminal device and that is allocated after the fifth USS.

In this embodiment, the foregoing third allocation sequence may be an SS ID sequence of USSs, or may be an allocation sequence determined according to a preset rule.

Alternatively, all CSSs may be first allocated, and then USSs are sequentially mapped in the third allocation sequence. if a quantity of first monitoring objects that need to be monitored after a USS is allocated exceeds the limit of the first monitoring objects that can be monitored by the terminal device, for example, exceeds at least one of the TRP limit, the cell limit, or the CA limit, allocation of the USS and a USS to be allocated after the USS may be quit.

It should be noted that the first TRP is a TRP associated with a discarded USS, and the first CORESET is a CORESET associated with a discarded USS.

In this embodiment of the present disclosure, overbooking processing may be performed on a USS associated with any TRP. In this way, a case that a total quantity of blind detections of UE exceeds a maximum quantity of supported PDCCH candidates or a quantity of channel estimates exceeds a maximum quantity of channel estimates can be reduced, flexibility of allocating a search space can be improved, and complexity of configuring a search space by the network side can be reduced.

Optionally, before the discarding part or all UE-specific search spaces (USSs) associated with a first transmission object, the method may further include:

allocating a CSS configured for the terminal device; and the discarding part or all UE-specific search spaces (USSs) associated with a first transmission object includes:

sequentially allocating, in a fourth allocation sequence, USSs associated with the TRPs configured for the terminal device; and if a quantity of first monitoring objects that need to be monitored after a seventh USS associated with a fourth transmission object is allocated exceeds the limit of the first monitoring objects that can be monitored by the terminal device, discarding the seventh USS, and continuing to allocate a ninth USS; and discarding an eighth USS if the eighth USS exists, where the fourth transmission object includes a fourth TRP or a fourth CORESET, the fourth TRP is any TRP in the TRPs configured for the terminal device, the fourth CORESET is any CORESET in the target CORESET, the target CORESET is a CORESET configured for the terminal device to monitor a search space, the seventh USS is any USS associated with the fourth transmission object, the eighth USS is a USS that is in USSs associated with the fourth transmission object and that is allocated after the seventh USS, the ninth USS is a USS associated with a fifth transmission object, and the fifth transmission object is different from the fourth transmission object.

In this embodiment, the foregoing fourth allocation sequence may be an SS ID sequence of USSs, or may be an allocation sequence determined according to a preset rule.

The fifth transmission object is different from the fourth transmission object. For example, if the fourth transmission object is a TRP-1, the fifth transmission object may be a TRP-2; or if the fourth transmission object is a CORESET-1, the fifth transmission object may be a CORESET-2.

For example, if a quantity of to-be-monitored PDCCH candidates or non-overlapping CCEs in SSs associated with a TRP or a CORESET exceeds a maximum PDCCH processing capability of the UE, for example, exceeds at least one of the TRP limit, the cell limit, or the CA limit, allocation of all subsequent SSs associated with the TRP or the CORESET is stopped, and SSs associated with another TRP or CORESET continues to be mapped until SSs associated with all TRPs is mapped, or a quantity of to-be-monitored PDCCH candidates or non-overlapping CCEs exceeds at least one of the TRP limit, the cell limit, or the CA limit, the allocation is stopped.

For another example, a cell is configured with a TRP-1 and a TRP-2. If a quantity of PDCCH candidates associated with the TRP-1 that need to be monitored by the UE after a USS of the TRP-1 is allocated exceeds the TRP limit, but a quantity of PDCCH candidates associated with the cell that are currently allocated to be monitored does not exceed the cell limit, allocation of the USS and a USS that is in USSs associated with the TRP-1 and that is to be allocated after the USS is stopped, and USSs of the TRP-2 may continue to be allocated until a quantity of PDCCH candidates associated with the TRP-2 that need to be monitored by the UE exceeds the TRP limit or a quantity of PDCCH candidates associated with the cell that need to be monitored by the UE exceeds the cell limit.

It should be noted that the first TRP is a TRP associated with a discarded USS, and the first CORESET is a CORESET associated with a discarded USS.

In this embodiment of the present disclosure, overbooking processing may be performed on a USS associated with any TRP. In this way, a case that a total quantity of blind detections of UE exceeds a maximum quantity of supported PDCCH candidates or a quantity of channel estimates exceeds a maximum quantity of channel estimates can be reduced, and flexibility of allocating a search space can be improved. In addition, a USS associated with a TRP or a CORESET other than the TRP or the CORESET on which overbooking occurs may be further allocated, so that a PDCCH processing capability of the terminal device can be fully used to improve data receiving performance.

Optionally, in a case that carrier aggregation (CA) is configured for the terminal device, the first TRP is a TRP of a primary cell PCell or a primary secondary cell (Primary Secondary cell, PSCell), and the first CORESET is a CORESET of the PCell or the PSCell.

In this embodiment, in a case that CA is configured for the terminal device, overbooking processing may be performed only on a TRP or a CORESET of the PCell or the PSCell. A search space of the SCell may be directly allocated, that is, all SSs associated with the SCell may be directly allocated. Optionally, a configured quantity of first monitoring objects in a search space of the SCell does not exceed the limit of the first monitoring objects that can be monitored by the terminal device.

It should be noted that for related content of performing overbooking processing on the TRP or the CORESET of the PCell or the PSCell, refer to the foregoing description. Details are not described herein in this embodiment.

Optionally, before the discarding part search spaces configured for the terminal device, the method further includes:
in a case that carrier aggregation (CA) is configured for the terminal device, grouping cells in which PDCCHs are monitored based on TRPs associated with the cells, to obtain at least two groups; and
the discarding part search spaces configured for the terminal device includes:
sequentially allocating search spaces of a first cell in each of the at least two groups in a fifth allocation sequence, where the first cell includes a primary cell PCell or a primary secondary cell PSCell in each group; and
discarding a first search space if a quantity of first monitoring objects that need to be monitored after the first search space is allocated exceeds the limit of the first monitoring objects that can be monitored by the terminal device, and discarding a second search space if the second search space exists, where
the first search space is any search space of the first cell, and the second search space is a search space that is in the search spaces of the first cell and that is allocated after the first search space.

In this embodiment, the foregoing fifth allocation sequence may be an SS ID sequence of search spaces, or may be an allocation sequence determined according to a preset rule.

Optionally, in a case that CA is configured for the terminal device, cells in which PDCCHs are monitored may be grouped based on TRPs, or cells on which PDCCHs are monitored and search spaces thereof may be grouped based on TRPs.

For example, if the PCell is associated with a TRP-1 and a TRP-2, and the SCell is associated with the TRP-1, a group corresponding to the TRP-1 may include the PCell and the SCell, and a group corresponding to the TRP-2 may include the PCell.

For another example, if the PCell is associated with a TRP-1 and a TRP-2, the SCell is associated with the TRP-1, the PCell associated with the TRP-1 is associated with a CSS, a USS 1, and a USS 3, the SCell associated with the TRP-1 is associated with a USS 2 and a USS 4, the PCell associated with the TRP-2 is associated with the USS 1, and the SCell associated with the TRP-2 is associated with the USS 2, a group corresponding to the TRP-1 may include the PCell and the SCell, search spaces of the PCell in the group may include the CSS, the USS 1, and the USS 3, and search spaces of the SCell in the group may include the USS 2 and the USS 4; and a group corresponding to the TRP-2 may include the PCell and the SCell, a search space of the PCell in the group may include the USS 1, and a search space of the SCell in the group may include the USS 2.

In this embodiment, SSs of each cell may be allocated in each group, and overbooking processing may be performed on a search space of a PCell or a PSCell in each group. For example, SSs are allocated in an SS ID sequence of USSs. If a quantity of first monitoring objects that need to be monitored after an SS is allocated exceeds the limit of the first monitoring objects that can be monitored by the terminal device, for example, exceeds at least one of the TRP limit, the cell limit, the CA limit, or the group limit, allocation of all subsequent SSs is stopped.

Optionally, the method may further include:
allocating all search spaces of a secondary cell SCell in each of the at least two groups, where a configured quantity of first monitoring objects in a search space of the SCell does not exceed the limit of the first monitoring objects that can be monitored by the terminal device.

In this embodiment, all the search spaces of the SCell in each group may be directly allocated, and the network side may configure that the quantity of first monitoring objects in the search space of the SCell does not exceed the limit of the first monitoring objects that can be monitored by the terminal device. In this way, complexity of allocating a search space by the UE can be reduced.

An embodiment of the present disclosure provides a search space configuration method, applied to a network side device. Referring to FIG. 4, FIG. 4 is a flowchart of a search space configuration method according to an embodiment of the present disclosure. As shown in FIG. 4, the method includes the following steps.

Step 401: Configure a search space set for a terminal device.

A transmission and reception point (TRP) is configured for the terminal device; and a quantity of first monitoring objects in the search space set does not exceed a limit of first monitoring objects that can be monitored by the terminal device, or a quantity of first monitoring objects in a search space associated with a second transmission object in the search space set does not exceed a limit of first monitoring objects that can be monitored by the terminal device, or a quantity of first monitoring objects in a search space associated with a secondary cell SCell in the search space set does not exceed a limit of first monitoring objects that can be monitored by the terminal device; and the first monitoring object includes a physical downlink control channel (PDCCH) candidate or a non-overlapping control channel element (CCE), the second transmission object includes a second TRP or a second control resource set (CORESET), the second TRP is a TRP other than a specific TRP in TRPs configured for the terminal device, the second CORESET is a CORESET other than a specific CORESET in a target CORESET, and the target CORESET is a CORESET configured for the terminal device to monitor a search space.

In an implementation, in a case that at least two TRPs are configured for the terminal device, the quantity of first monitoring objects in the search space set configured by the network side device for the terminal device does not exceed the limit of the first monitoring objects that can be monitored by the terminal device, so that a case that a total quantity of blind detections of UE exceeds a maximum quantity of supported PDCCH candidates or a quantity of channel estimates exceeds a maximum quantity of channel estimates can be avoided, and complexity of allocating a search space by the UE is reduced.

In another implementation, in a case that at least two TRPs are configured for the terminal device, the network side may configure that a quantity of first monitoring objects in a search space associated with a TRP other than the specific TRP does not exceed the limit of the first monitoring objects that can be monitored by the terminal device, or the network side may configure that a quantity of first monitoring objects in a search space associated with a CORESET other than the specific CORESET does not exceed the limit of the first monitoring objects that can be monitored by the terminal device. In this way, a case that a total quantity of blind detections of UE exceeds a maximum quantity of supported PDCCH candidates or a quantity of channel estimates exceeds a maximum quantity of channel estimates can be reduced, and flexibility of configuring a search space can be improved.

In another implementation, in a case that at least two TRPs are configured for the terminal device, the network side may configure that the quantity of first monitoring objects in the search space associated with the SCell does not exceed the limit of the first monitoring objects that can be monitored by the terminal device. In this way, a case that a total quantity of blind detections of UE exceeds a maximum quantity of supported PDCCH candidates or a quantity of channel estimates exceeds a maximum quantity of channel estimates can be reduced, and flexibility of configuring a search space can be improved.

Optionally, the limit of the first monitoring objects that can be monitored by the terminal device includes at least one of the following:

a TRP limit, where the TRP limit is a maximum quantity of first monitoring objects that are associated with one TRP in one cell and that can be monitored by the terminal device;

a cell limit, where the cell limit is a maximum quantity of first monitoring objects that can be monitored by the terminal device in one cell;

a carrier aggregation (CA) limit, where the CA limit is a maximum quantity of first monitoring objects that can be monitored by the terminal device in a case that CA is configured for the terminal device; or a group limit, where the group limit is a maximum quantity of first monitoring objects that can be monitored by the terminal device in one group, and the group is obtained by grouping cells in which PDCCHs are monitored based on TRPs.

In this embodiment, the TRP limit (TRP Limit) may indicate a maximum processing capability of the terminal device to monitor a PDCCH candidate associated with one TRP in one cell. The TRP limit may include a maximum quantity of PDCCH candidates that are associated with one TRP in one cell and that can be monitored by the terminal device, or a maximum quantity of non-overlapping CCEs that are associated with one TRP in one cell and that can be monitored by the terminal device. For example, a monitoring object is a PDCCH candidate. If the TRP limit is 10, it indicates that the terminal device can monitor a maximum of 10 PDCCH candidates associated with one TRP in one cell. If a quantity of to-be-monitored PDCCH candidates allocated to a TRP in a cell exceeds 10, it indicates that the PDCCH processing capability of the terminal device is exceeded.

The cell limit (Cell Limit) may indicate a maximum processing capability of the terminal device to monitor a PDCCH candidate in one cell. The cell limit may include a maximum quantity of PDCCH candidates that can be monitored by the terminal device in one cell, or a maximum quantity of non-overlapping CCEs that can be monitored by the terminal device in one cell. For example, a monitoring object is a PDCCH candidate. If the cell limit is 20, it indicates that the terminal device can monitor a maximum of 20 PDCCH candidates in one cell. If a quantity of to-be-monitored PDCCH candidates allocated to a cell exceeds 20, it indicates that the PDCCH processing capability of the terminal device is exceeded.

The CA limit (CA Limit) may indicate a maximum processing capability of the terminal device to monitor PDCCH candidates in a plurality of cells in a case that CA is configured for the terminal device. The CA limit may include a maximum quantity of PDCCH candidates or a maximum quantity of non-overlapping CCEs that can be monitored by UE in a case that CA is configured for the terminal device. It should be noted that, in a case that CA is configured for the terminal device, PDCCH candidates may be allocated only to a part of a plurality of cells for monitoring, or a PDCCH candidate may be allocated to each of the plurality of cells for monitoring. For example, a monitoring object is a PDCCH candidate. If the CA limit is 20, it indicates that the terminal device can monitor a maximum of 20 PDCCH candidates in a case that CA is configured for the terminal device. If CA of two cells is configured for the UE, that is, a primary cell (Primary Cell, PCell) and a secondary cell (Secondary Cell, SCell), and a sum of a quantity of to-be-monitored PDCCH candidates allocated to the PCell and a quantity of to-be-monitored PDCCH candidates allocated to the SCell exceeds 20, it indicates that the PDCCH processing capability of the terminal device is exceeded.

The group limit (Group Limit) may indicate a maximum processing capability of the terminal device to monitor a PDCCH candidate in one group. The group limit may include a maximum quantity of PDCCH candidates that can be monitored by the terminal device in one group, or a maximum quantity of non-overlapping CCEs that can be monitored by the terminal device in one group. For example, a monitoring object is a PDCCH candidate. If the group limit is 15, it indicates that the terminal device can monitor a maximum of 15 PDCCH candidates in one group. If a quantity of to-be-monitored PDCCH candidates allocated to a group exceeds 15, it indicates that the PDCCH processing capability of the terminal device is exceeded.

The foregoing group may represent a TRP-based group of a cell in which a PDCCH is monitored. For example, if the PCell is associated with a TRP-1 and a TRP-2, and the SCell is associated with the TRP-1, a group corresponding to the TRP-1 may include the PCell and the SCell, and a group corresponding to the TRP-2 may include the PCell.

Optionally, the group limit may be a value configured on the network side, and the value does not exceed a maximum PDCCH processing capability reported by the UE.

Optionally, the specific TRP includes at least one of the following:
  a TRP associated with a common search space (CSS);
  a TRP associated with a specific downlink control information (DCI) format;
  a TRP associated with a specific identifier or a specific index; or
  a TRP indicated or configured by a network side device.

In this embodiment, the foregoing specific DCI format may include a fallback DCI (fallback DCI) format, for example, a DCI format 0_0 or a DCI format 1_0.

The foregoing TRP associated with the specific identifier may include a TRP associated with a specific ID, for example, a TRP associated with a minimum or maximum TCI state ID, or a TRP whose ID is 0. The foregoing TRP associated with the specific index (Index) is, for example, a TRP with a minimum index or a maximum index or an index of 0.

The foregoing TRP indicated by the network side device may be a TRP indicated by the network side device by using signaling such as DCI. The foregoing TRP configured by the network side device may be a TRP configured by the network side device by using signaling such as RRC.

Optionally, the specific CORESET includes at least one of the following:
  a CORESET associated with a common search space (CSS);
  a CORESET associated with a specific downlink control information (DCI) format;
  a CORESET associated with a specific identifier or a specific index;
  a CORESET indicated or configured by a network side device; or
  a CORESET associated with a specific TRP.

In this embodiment, the foregoing specific DCI format may include a fallback DCI (fallback DCI) format, for example, a DCI format 0_0 or a DCI format 1_0.

The foregoing CORESET associated with the specific identifier may include a CORESET associated with a specific ID, for example, a CORESET associated with a minimum or maximum TCI state ID, or a CORESET whose ID is 0. The foregoing CORESET associated with the specific index (Index) is, for example, a CORESET with a minimum index or a maximum index or an index of 0.

The foregoing CORESETP indicated by the network side device may be a CORESETP indicated by the network side device by using signaling such as DCI. The foregoing CORESET configured by the network side device may be a CORESET configured by the network side device by using signaling such as RRC.

Optionally, the foregoing specific TRP may include at least one of the following: a TRP associated with a CSS, a TRP associated with a specific DCI format, a TRP associated with a specific identifier or a specific index; or a TRP indicated or configured by a network side device. In this way, the specific CORESET may be determined based on the specific TRP.

Optionally, in a case that CA is configured for the terminal device, the specific TRP is a TRP of a PCell or a PSCell, and the specific CORESET is a CORESET of the PCell or the PSCell.

In this embodiment, in a case that CA is configured for the terminal device, overbooking processing may be performed only on a TRP or a CORESET of the PCell or the PSCell. A search space of the SCell may be directly allocated, that is, all SSs associated with the SCell may be directly allocated. Optionally, a configured quantity of first monitoring objects in a search space of the SCell does not exceed the limit of the first monitoring objects that can be monitored by the terminal device.

It should be noted that for related content of performing overbooking processing on the TRP or the CORESET of the PCell or the PSCell, refer to the foregoing description. Details are not described herein in this embodiment.

The following describes this embodiment of the present disclosure with reference to examples:

Example 1

A PDCCH processing capability of UE is: a TRP limit=10 and a cell limit=20.

One cell and two TRPs are configured for the UE. A TRP-1 is associated with a CSS (quantity of to-be-monitored PDCCH candidates=4), a USS 1 (quantity of to-be-monitored PDCCH candidates=4), and a USS 3 (quantity of to-be-monitored PDCCH candidates=3), and a TRP-2 is associated with a USS 2 (quantity of to-be-monitored PDCCH candidates=4) and a USS 4 (quantity of to-be-monitored PDCCH candidates=2).

Based on the foregoing content, the search space allocation method provided in this embodiment of the present disclosure may include the following steps:
  Step a11: The UE determines that the TRP-1 is a P-TRP, and maps a CSS.

Step a12: The UE maps a USS of the P-TRP, and the UE discards the USS 3 because a total quantity of to-be-monitored PDCCH candidate of the P-TRP (TRP-1) after the USS 3 is mapped exceeds the TRP limit (4+4+3>10).

Step a13: The UE maps a USS of another TRP, namely, the USS 2 and the USS 4.

In this step, the another TRP may be a TRP other than the P-TRP, namely, the TRP-2.

It can be learned from the foregoing that SSs mapped in this example are the CSS, the USS 1, the USS 2, and the USS 4, a quantity of to-be-monitored PDCCH candidates of the TRP-1 is 8, a quantity of to-be-monitored PDCCH candidates of the TRP-2 is 6, and a quantity of to-be-monitored PDCCH candidates of the cell is 14, which do not exceed the PDCCH candidate processing capability of the UE.

It should be noted that an execution sequence of step a12 and step a13 is not limited in this example, that is, step a12 may be performed first, and then step a13 is performed; or step a13 may be performed first, and then step a12 is performed; or step a12 and step a13 may be performed simultaneously.

In addition, in this example, a quantity of to-be-monitored PDCCH candidates is used to describe the PDCCH processing capability of the UE, but a quantity of non-overlapping CCEs can also be used.

Example 2

A PDCCH processing capability of UE is: a TRP limit=10 and a cell Limit=15.

One Cell and two TRPs are configured for the UE. A TRP-1 is associated with a CSS (quantity of to-be-monitored PDCCH candidates=4), a USS 1 (quantity of to-be-monitored PDCCH candidates=4), and a USS 3 (quantity of to-be-monitored PDCCH candidates=2), and a TRP-2 is associated with a USS 2 (quantity of to-be-monitored PDCCH candidates=4) and a USS 4 (quantity of to-be-monitored PDCCH candidates=2).

Based on the foregoing content, the search space allocation method provided in this embodiment of the present disclosure may include the following steps:

Step a21: The UE determines that the TRP-1 is a P-TRP, and maps a CSS.

Step a22: The UE maps a USS of another TRP, namely, the USS 2 and the USS 4.

In this step, the another TRP may be a TRP other than the P-TRP, namely, the TRP-2.

Step a23: The UE maps a USS of the P-TRP, and the UE discards the USS 3 if a total quantity of to-be-monitored PDCCH candidates of the P-TRP after the USS 3 is mapped does not exceed the TRP limit (4+4+2<=10), but a total quantity of to-be-monitored PDCCH candidates of the cell of the UE exceeds the cell limit (4+4+2+4+2>15).

It can be learned from the foregoing that SSs mapped in this example are the CSS, the USS 1, the USS 2, and the USS 4, a quantity of to-be-monitored PDCCH candidates of the TRP-1 is 8, a quantity of to-be-monitored PDCCH candidates of the TRP-2 is 6, and a quantity of to-be-monitored PDCCH candidates of the cell is 14, which do not exceed the PDCCH processing capability of the UE.

Example 3

A PDCCH candidate processing capability of UE is: a TRP limit=10 and a cell Limit=15.

One Cell and two TRPs are configured for the UE. A TRP-1 is associated with a CSS (quantity of to-be-monitored PDCCH candidates=4), a USS 1 (quantity of to-be-monitored PDCCH candidates=4), and a USS 3 (quantity of to-be-monitored PDCCH candidates=3), and a TRP-2 is associated with a USS 2 (quantity of to-be-monitored PDCCH candidates=2) and a USS 4 (quantity of to-be-monitored PDCCH candidates=5).

Based on the foregoing content, the search space allocation method provided in this embodiment of the present disclosure may include the following steps:

Step a31: The UE maps a CSS, and maps a USS in an SS ID sequence.

Step a32: When a USS 3 is mapped, a total quantity of to-be-monitored PDCCH candidates (4+4+2+3=13) exceeds the TRP limit (10), and therefore the UE discards the USS 3 and the USS 4.

It can be learned from the foregoing that SSs mapped in this example are the CSS, the USS 1, and the USS 2, a quantity of to-be-monitored PDCCH candidates of the TRP-1 is 8, a quantity of to-be-monitored PDCCH candidates of the TRP-2 is 2, and a quantity of to-be-monitored PDCCH candidates of the cell is 10, which do not exceed the PDCCH processing capability of the UE.

Example 4

A PDCCH candidate processing capability of UE is: a TRP limit=10 and a cell Limit=15.

One Cell and two TRPs are configured for the UE. A TRP-1 is associated with a CSS (quantity of to-be-monitored PDCCH candidates=4), a USS 1 (quantity of to-be-monitored PDCCH candidates=4), and a USS 3 (quantity of to-be-monitored PDCCH candidates=3), and a TRP-2 is associated with a USS 2 (quantity of to-be-monitored PDCCH candidates=2) and a USS 4 (quantity of to-be-monitored PDCCH candidates=5).

Based on the foregoing content, the search space allocation method provided in this embodiment of the present disclosure may include the following steps:

Step a41: The UE maps a CSS, and maps a USS in an SS ID sequence.

Step a42: After the USS 3 is mapped, a total quantity of to-be-monitored PDCCH candidates (4+4+3=11) exceeds the TRP limit (10), and therefore the UE discards the USS 3 and continues to map the USS 4.

It can be learned from the foregoing that SSs mapped in this example are the CSS, the USS 1, the USS 2, and the USS 4, a quantity of to-be-monitored PDCCH candidates of the TRP-1 is 8, a quantity of to-be-monitored PDCCH candidates of the TRP-2 is 7, and a quantity of to-be-monitored PDCCH candidates of the cell is 15, which do not exceed the PDCCH processing capability of the UE.

Example 5

A PDCCH candidate processing capability of UE is: a TRP limit=10, a cell limit=15, and a CA limit=20.

CA of two Cells and two TRPs are configured for the UE, where a TRP-1 of a PCell is associated with a CSS (quantity of to-be-monitored PDCCH candidates=4), a USS 1 (quantity of to-be-monitored PDCCH candidates=4), and a USS 3 (quantity of to-be-monitored PDCCH candidates=3), a TRP-2 is associated with a USS 2 (quantity of to-be-monitored PDCCH candidates=2) and a USS 4 (quantity of to-be-monitored PDCCH candidates=5), a TRP-1 of a the SCell is associated with the USS 1 (quantity of to-bemonitored PDCCH candidates=2), and a TRP-2 is associated with the USS 2 (quantity of to-be-monitored PDCCH candidates=2).

Based on the foregoing content, the search space allocation method provided in this embodiment of the present disclosure may include the following steps:

Step a51: The UE maps a CSS on the PCell, maps USSs in an SS ID sequence, and performs overbooking processing.

The overbooking processing may be discarding part search spaces configured for the UE in a case that it is configured that a quantity of PDCCH candidates or non-overlapping CCEs monitored by the UE exceeds the PDCCH processing capability of the UE. For a specific manner of discarding part search spaces configured for the UE, refer to the foregoing related description. Details are not described herein again.

SSs mapped in this example are the CSS, the USS 1, the USS 2, and the USS 4, a quantity of to-be-monitored PDCCH candidates of the TRP-1 is 8, a quantity of to-be-monitored PDCCH candidates of the TRP-2 is 7, and a quantity of to-be-monitored PDCCH candidates of the cell is 15, which do not exceed the PDCCH processing capability of the UE.

Step a61: The UE maps all USSs of the SCell, which does not exceed the PDCCH candidate processing capability of the UE.

It can be learned from the foregoing that SSs mapped in this example are the CSS, the USS 1, the USS 2, and the USS 4 associated with the PCell, and the USS 1 and the USS 2 associated with the SCell, and a total quantity of to-be-monitored PDCCH candidates of all cells is 15+4=19<20, which does not exceed the PDCCH processing capability of the UE.

In conclusion, this embodiment of the present disclosure provides a manner of mapping a search space and monitoring a PDCCH candidate for a system in which an M-TRP is configured, so that a PDCCH blind detection resource can be flexibly allocated in an M-TRP transmission scenario, system scheduling flexibility is improved, and implementation complexity and power consumption of the UE are reduced.

Referring to FIG. 5, FIG. 5 is a structural diagram of a terminal device according to an embodiment of the present disclosure. As shown in FIG. 5, a terminal device 500 includes:

a discarding module 501, configured to: in a case that a transmission and reception point (TRP) is configured for the terminal device, discard part search spaces configured for the terminal device if a quantity of first monitoring objects in a search space set configured for the terminal device exceeds a limit of first monitoring objects that can be monitored by the terminal device, where the first monitoring object includes a physical downlink control channel (PDCCH) candidate or a non-overlapping control channel element (CCE).

Optionally, the limit of the first monitoring objects that can be monitored by the terminal device includes at least one of the following:

a TRP limit, where the TRP limit is a maximum quantity of first monitoring objects that are associated with one TRP in one cell and that can be monitored by the terminal device;

a cell limit, where the cell limit is a maximum quantity of first monitoring objects that can be monitored by the terminal device in one cell;

a carrier aggregation (CA) limit, where the CA limit is a maximum quantity of first monitoring objects that can be monitored by the terminal device in a case that CA is configured for the terminal device; or a group limit, where the group limit is a maximum quantity of first monitoring objects that can be monitored by the terminal device in one group, and the group is obtained by grouping cells in which PDCCHs are monitored based on TRPs.

Optionally, the discarding module includes:

a first discarding unit, configured to discard part or all UE-specific search spaces (USSs) associated with a first transmission object, where the first transmission object includes a first TRP or a first control resource set (CORESET), the first TRP includes at least one TRP in TRPs configured for the terminal device, and the first CORESET includes at least one CORESET in CORESETs configured for the terminal device to monitor search spaces.

Optionally, the first TRP is a specific TRP in the TRPs configured for the terminal device, or the first CORESET is a specific CORESET in a target CORESET.

Optionally, the specific TRP includes at least one of the following:

a TRP associated with a common search space (CSS);

a TRP associated with a specific downlink control information (DCI) format;

a TRP associated with a specific identifier or a specific index; or a TRP indicated or configured by a network side device.

Optionally, the specific CORESET includes at least one of the following:

a CORESET associated with a common search space (CSS);

a CORESET associated with a specific downlink control information (DCI) format;

a CORESET associated with a specific identifier or a specific index;

a CORESET indicated or configured by a network side device; or a CORESET associated with a specific TRP.

Optionally, the terminal device further includes:

a first allocation unit, configured to: before the discarding part or all UE-specific search spaces (USSs) associated with a first transmission object, allocate a common search space (CSS) configured for the terminal device, where the first discarding unit is configured to:

sequentially allocate, in a first allocation sequence, USSs associated with the first transmission object; and discard a first USS if a quantity of first monitoring objects that need to be monitored after the first USS is allocated exceeds the limit of the first monitoring objects that can be monitored by the terminal device, and discard a second USS if the second USS exists, where the first USS is any USS associated with the first transmission object, and the second USS is a USS that is in the USSs associated with the first transmission object and that is allocated after the first USS.

Optionally, the terminal device further includes:

a sixth allocation module, configured to allocate all USSs associated with a second transmission object, where the second transmission object includes a second TRP or a second CORESET, the second TRP is a TRP other than the first TRP in the TRPs configured for the terminal device, the second CORESET is a CORESET other than the first CORESET in the target CORESET, a configured first quantity does not exceed the limit of the first monitoring objects that can be monitored by the terminal device, and the first quantity is a quantity of first monitoring objects in USSs associated with the second transmission object.

Optionally, a quantity of first monitoring objects in a search space allocated in one cell of the terminal device does not exceed a cell limit; and the cell limit is a maximum quantity of first monitoring objects that can be monitored by the terminal device in one cell.

Optionally, a quantity of first monitoring objects in a search space allocated in a case that carrier aggregation (CA) is configured for the terminal device does not exceed a CA limit; and the CA limit is a maximum quantity of first monitoring objects that can be monitored by the terminal device in a case that CA is configured for the terminal device.

Optionally, the terminal device further includes:

a second allocation module, configured to: before the discarding part or all UE-specific search spaces (USSs) associated with a first transmission object, allocate a common search space (CSS) configured for the terminal device; and a third allocation module, configured to allocate all USSs associated with a third transmission object, where the third transmission object includes a third TRP or a third CORESET, the third TRP is a TRP other than the first TRP in the TRPs configured for the terminal device, the third CORESET is a CORESET other than the first CORESET in the target CORESET, the target CORESET is a CORESET configured for the terminal device to monitor a search space, a configured second quantity does not exceed the limit of the first monitoring objects that can be monitored by the terminal device, and the second quantity is a quantity of first monitoring objects in USSs associated with the third transmission object, where the first discarding unit is configured to:

sequentially allocate, in a second allocation sequence, USSs associated with the first transmission object; and discard a third USS if a quantity of first monitoring objects that need to be monitored after the third USS is allocated exceeds the limit of the first monitoring objects that can be monitored by the terminal device, and discard a fourth USS if the fourth USS exists, where the third USS is any USS associated with the first transmission object, and the fourth USS is a USS that is in the USSs associated with the first transmission object and that is allocated after the third USS.

Optionally, the terminal device further includes:

a fourth allocation module, configured to: before the discarding part or all UE-specific search spaces (USSs) associated with a first transmission object, allocate a common search space (CSS) configured for the terminal device, where the first discarding unit is configured to:

sequentially allocate, in a third allocation sequence, USSs associated with the TRPs configured for the terminal device; and discard a fifth USS if a quantity of first monitoring objects that need to be monitored after the fifth USS is allocated exceeds the limit of the first monitoring objects that can be monitored by the terminal device, and discard a sixth USS if the sixth USS exists, where the fifth USS is any USS associated with the TRPs configured for the terminal device, and the sixth USS is a USS that is in the USSs associated with the TRPs configured for the terminal device and that is allocated after the fifth USS.

Optionally, the terminal device further includes:

a fifth allocation module, configured to: before the discarding part or all UE-specific search spaces (USSs) associated with a first transmission object, allocate a common search space (CSS) configured for the terminal device, where the first discarding unit is configured to:

sequentially allocate, in a fourth allocation sequence, USSs associated with the TRPs configured for the terminal device; and if a quantity of first monitoring objects that need to be monitored after a seventh USS associated with a fourth transmission object is allocated exceeds the limit of the first monitoring objects that can be monitored by the terminal device, discard the seventh USS, and continue to allocate a ninth USS; and discard an eighth USS if the eighth USS exists, where the fourth transmission object includes a fourth TRP or a fourth CORESET, the fourth TRP is any TRP in the TRPs configured for the terminal device, the fourth CORESET is any CORESET in the target CORESET, the target CORESET is a CORESET configured for the terminal device to monitor a search space, the seventh USS is any USS associated with the fourth transmission object, the eighth USS is a USS that is in USSs associated with the fourth transmission object and that is allocated after the seventh USS, the ninth USS is a USS associated with a fifth transmission object, and the fifth transmission object is different from the fourth transmission object.

Optionally, in a case that carrier aggregation (CA) is configured for the terminal device, the first TRP is a TRP of a primary cell PCell or a primary secondary cell PSCell, and the first CORESET is a CORESET of the PCell or the PSCell.

Optionally, the terminal device further includes:

a grouping module, configured to: before the discarding part search spaces configured for the terminal device, in a case that carrier aggregation (CA) is configured for the terminal device, group cells in which PDCCHs are monitored based on TRPs associated with the cells, to obtain at least two groups, where the discarding module includes:

an allocation unit, configured to sequentially allocate search spaces of a first cell in each of the at least two groups in a fifth allocation sequence, where the first cell includes a primary cell PCell or a primary secondary cell PSCell in each group; and a second discarding unit, configured to discard a first search space if a quantity of first monitoring objects that need to be monitored after the first search space is allocated exceeds the limit of the first monitoring objects that can be monitored by the terminal device, and discard a second search space if the second search space exists, where the first search space is any search space of the first cell, and the second search space is a search space that is in the search spaces of the first cell and that is allocated after the first search space.

Optionally, the terminal device further includes:

a seventh allocation module, configured to allocate all search spaces of a secondary cell SCell in each of the at least two groups, where a configured quantity of first monitoring objects in a search space of the SCell does not exceed the limit of the first monitoring objects that can be monitored by the terminal device.

The terminal device 500 provided in this embodiment of the present disclosure can implement the processes implemented by the terminal device in the foregoing method embodiment. To avoid repetition, details are not described herein again.

According to the terminal device 500 in this embodiment of the present disclosure, the discarding module 501 is configured to: in a case that a transmission and reception point (TRP) is configured for the terminal device, discard part search spaces configured for the terminal device if a quantity of first monitoring objects in a search space set configured for the terminal device exceeds a limit of first monitoring objects that can be monitored by the terminal device. In this way, a case that a total quantity of blind detections of UE exceeds a maximum quantity of supported PDCCH candidates or a quantity of channel estimates exceeds a maximum quantity of channel estimates can be reduced, and flexibility of allocating a blind detection resource of a PDCCH candidate can be improved.

Figure 6:
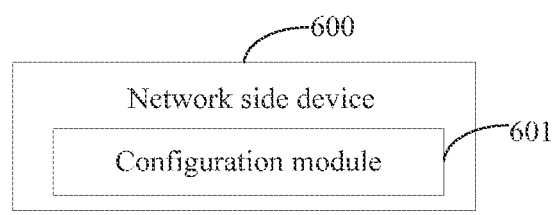
FIG. 6 is a structural diagram of a network side device according to an embodiment of the present disclosure.

Referring to FIG. 6, FIG. 6 is a structural diagram of a network side device according to an embodiment of the present disclosure. As shown in FIG. 6, a network side device 600 includes:
a configuration module 601, configured to configure a search space set for a terminal device, where
a transmission and reception point (TRP) is configured for the terminal device; and a quantity of first monitoring objects in the search space set does not exceed a limit of first monitoring objects that can be monitored by the terminal device, or a quantity of first monitoring objects in a search space associated with a second transmission object in the search space set does not exceed a limit of first monitoring objects that can be monitored by the terminal device, or a quantity of first monitoring objects in a search space associated with a secondary cell SCell in the search space set does not exceed a limit of first monitoring objects that can be monitored by the terminal device; and
the first monitoring object includes a physical downlink control channel (PDCCH) candidate or a non-overlapping control channel element (CCE), the second transmission object includes a second TRP or a second control resource set (CORESET), the second TRP is a TRP other than a specific TRP in TRPs configured for the terminal device, the second CORESET is a CORESET other than a specific CORESET in a target CORESET, and the target CORESET is a CORESET configured for the terminal device to monitor a search space.

Optionally, the limit of the first monitoring objects that can be monitored by the terminal device includes at least one of the following:
a TRP limit, where the TRP limit is a maximum quantity of first monitoring objects that are associated with one TRP in one cell and that can be monitored by the terminal device;
a cell limit, where the cell limit is a maximum quantity of first monitoring objects that can be monitored by the terminal device in one cell;
a carrier aggregation (CA) limit, where the CA limit is a maximum quantity of first monitoring objects that can be monitored by the terminal device in a case that CA is configured for the terminal device; or a group limit, where the group limit is a maximum quantity of first monitoring objects that can be monitored by the terminal device in one group, and the group is obtained by grouping cells in which PDCCHs are monitored based on TRPs.

Optionally, the specific TRP includes at least one of the following:
a TRP associated with a common search space (CSS);
a TRP associated with a specific downlink control information (DCI) format;
a TRP associated with a specific identifier or a specific index; or
a TRP indicated or configured by a network side device.

Optionally, the specific CORESET includes at least one of the following:
a CORESET associated with a common search space (CSS);
a CORESET associated with a specific downlink control information (DCI) format;
a CORESET associated with a specific identifier or a specific index;
a CORESET indicated or configured by a network side device; or
a CORESET associated with a specific TRP.

Optionally, in a case that carrier aggregation (CA) is configured for the terminal device, the specific TRP is a TRP of a primary cell PCell or a primary secondary cell PSCell, and the specific CORESET is a CORESET of the PCell or the PSCell.

The network side device 600 provided in this embodiment of the present disclosure can implement the processes implemented by the network side device in the foregoing method embodiment. To avoid repetition, details are not described herein again.

According to the network side device 600 in this embodiment of the present disclosure, the configuration module 601 is configured to configure a search space set for a terminal device, where a transmission and reception point (TRP) is configured for the terminal device; and a quantity of first monitoring objects in the search space set does not exceed a limit of first monitoring objects that can be monitored by the terminal device, or a quantity of first monitoring objects in a search space associated with a second transmission object in the search space set does not exceed a limit of first monitoring objects that can be monitored by the terminal device, or a quantity of first monitoring objects in a search space associated with a secondary cell SCell in the search space set does not exceed a limit of first monitoring objects that can be monitored by the terminal device. In this way, a case that a total quantity of blind detections of UE exceeds a maximum quantity of supported PDCCH candidates or a quantity of channel estimates exceeds a maximum quantity of channel estimates can be reduced.

Figure 7:
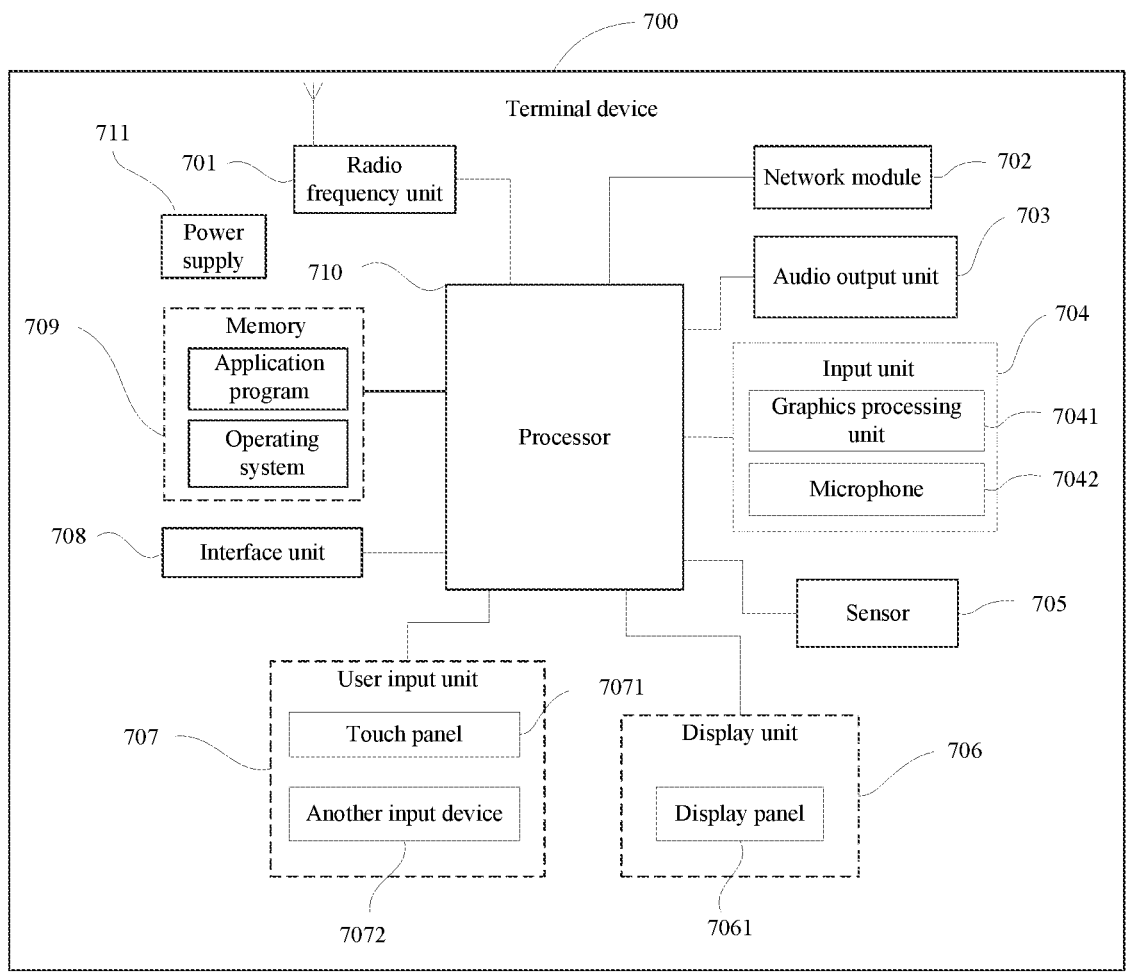
FIG. 7 is a structural diagram of a terminal device according to another embodiment of the present disclosure.

FIG. 7 is a structural diagram of another terminal device according to an embodiment of the present disclosure. Referring to FIG. 7, a terminal device 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. It can be understood by a person skilled in the art that, the terminal device structure shown in FIG. 7 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a notebook computer, a palmtop computer, an in-vehicle terminal, a wearable device, a pedometer, and the like.

The processor 710 is configured to: in a case that a transmission and reception point (TRP) is configured for the terminal device, discard some search spaces configured for the terminal device if a quantity of first monitoring objects in a search space set configured for the terminal device exceeds a limit of first monitoring objects that can be monitored by the terminal device, where the first monitoring object includes a physical downlink control channel (PDCCH) candidate or a non-overlapping control channel element (CCE).

Optionally, the limit of the first monitoring objects that can be monitored by the terminal device includes at least one of the following:
- a TRP limit, where the TRP limit is a maximum quantity of first monitoring objects that are associated with one TRP in one cell and that can be monitored by the terminal device;
- a cell limit, where the cell limit is a maximum quantity of first monitoring objects that can be monitored by the terminal device in one cell;
- a carrier aggregation (CA) limit, where the CA limit is a maximum quantity of first monitoring objects that can be monitored by the terminal device in a case that CA is configured for the terminal device; or
- a group limit, where the group limit is a maximum quantity of first monitoring objects that can be monitored by the terminal device in one group, and the group is obtained by grouping cells in which PDCCHs are monitored based on TRPs.

Optionally, the processor 710 is further configured to:
discard some or all UE-specific search spaces (USSs) associated with a first transmission object, where
the first transmission object includes a first TRP or a first control resource set (CORESET), the first TRP includes at least one TRP in TRPs configured for the terminal device, and the first CORESET includes at least one CORESET in CORESETs configured for the terminal device to monitor search spaces.

Optionally, the first TRP is a specific TRP in the TRPs configured for the terminal device, or the first CORESET is a specific CORESET in a target CORESET.

Optionally, the specific TRP includes at least one of the following:
- a TRP associated with a common search space (CSS);
- a TRP associated with a specific downlink control information (DCI) format;
- a TRP associated with a specific identifier or a specific index; or
- a TRP indicated or configured by a network side device.

Optionally, the specific CORESET includes at least one of the following:
- a CORESET associated with a common search space (CSS);
- a CORESET associated with a specific downlink control information (DCI) format; or
- a CORESET associated with a specific identifier or a specific index;

The CORESET; indicated or configured by the network side device is associated with a CORESET of a specific TRP.

Optionally, the processor 710 is further configured to:
before the discarding part or all UE-specific search spaces (USSs) associated with a first transmission object, allocate a common search space (CSS) configured for the terminal device; and
sequentially allocate, in a first allocation sequence, USSs associated with the first transmission object; and
discard a first USS if a quantity of first monitoring objects that need to be monitored after the first USS is allocated exceeds the limit of the first monitoring objects that can be monitored by the terminal device, and discard a second USS if the second USS exists, where
the first USS is any USS associated with the first transmission object, and the second USS is a USS that is in the USSs associated with the first transmission object and that is allocated after the first USS.

Optionally, the processor 710 is further configured to:
allocate all USSs associated with a second transmission object, where
the second transmission object includes a second TRP or a second CORESET, the second TRP is a TRP other than the first TRP in the TRPs configured for the terminal device, the second CORESET is a CORESET other than the first CORESET in the target CORESET, a configured first quantity does not exceed the limit of the first monitoring objects that can be monitored by the terminal device, and the first quantity is a quantity of first monitoring objects in USSs associated with the second transmission object.

Optionally, a quantity of first monitoring objects in a search space allocated in one cell of the terminal device does not exceed a cell limit; and
the cell limit is a maximum quantity of first monitoring objects that can be monitored by the terminal device in one cell.

Optionally, a quantity of first monitoring objects in a search space allocated in a case that carrier aggregation (CA) is configured for the terminal device does not exceed a CA limit; and
the CA limit is a maximum quantity of first monitoring objects that can be monitored by the terminal device in a case that CA is configured for the terminal device.

Optionally, the processor 710 is further configured to:
before the discarding part or all UE-specific search spaces (USSs) associated with a first transmission object, allocate a common search space (CSS) configured for the terminal device; and
allocate all USSs associated with a third transmission object, where the third transmission object includes a third TRP or a third CORESET, the third TRP is a TRP other than the first TRP in the TRPs configured for the terminal device, the third CORESET is a CORESET other than the first CORESET in the target CORESET, the target CORESET is a CORESET configured for the terminal device to monitor a search space, a configured second quantity does not exceed the limit of the first monitoring objects that can be monitored by the terminal device, and the second quantity is a quantity of first monitoring objects in USSs associated with the third transmission object; and
sequentially allocate, in a second allocation sequence, USSs associated with the first transmission object; and
discard a third USS if a quantity of first monitoring objects that need to be monitored after the third USS is allocated exceeds the limit of the first monitoring objects that can be monitored by the terminal device, and discard a fourth USS if the fourth USS exists, where the third USS is any USS associated with the first transmission object, and the fourth USS is a USS that is in the USSs associated with the first transmission object and that is allocated after the third USS.

Optionally, the processor 710 is further configured to:

before the discarding part or all UE-specific search spaces (USSs) associated with a first transmission object, allocate a common search space (CSS) configured for the terminal device; and sequentially allocate, in a third allocation sequence, USSs associated with the TRPs configured for the terminal device; and discard a fifth USS if a quantity of first monitoring objects that need to be monitored after the fifth USS is allocated exceeds the limit of the first monitoring objects that can be monitored by the terminal device, and discard a sixth USS if the sixth USS exists, where the fifth USS is any USS associated with the TRPs configured for the terminal device, and the sixth USS is a USS that is in the USSs associated with the TRPs configured for the terminal device and that is allocated after the fifth USS.

Optionally, the processor 710 is further configured to:

before the discarding part or all UE-specific search spaces (USSs) associated with a first transmission object, allocate a common search space (CSS) configured for the terminal device; and sequentially allocate, in a fourth allocation sequence, USSs associated with the TRPs configured for the terminal device; and if a quantity of first monitoring objects that need to be monitored after a seventh USS associated with a fourth transmission object is allocated exceeds the limit of the first monitoring objects that can be monitored by the terminal device, discard the seventh USS, and continue to allocate a ninth USS; and discard an eighth USS if the eighth USS exists, where the fourth transmission object includes a fourth TRP or a fourth CORESET, the fourth TRP is any TRP in the TRPs configured for the terminal device, the fourth CORESET is any CORESET in the target CORESET, the target CORESET is a CORESET configured for the terminal device to monitor a search space, the seventh USS is any USS associated with the fourth transmission object, the eighth USS is a USS that is in USSs associated with the fourth transmission object and that is allocated after the seventh USS, the ninth USS is a USS associated with a fifth transmission object, and the fifth transmission object is different from the fourth transmission object.

Optionally, in a case that carrier aggregation (CA) is configured for the terminal device, the first TRP is a TRP of a primary cell PCell or a primary secondary cell PSCell, and the first CORESET is a CORESET of the PCell or the PSCell.

Optionally, the processor 710 is further configured to:

before the discarding part search spaces configured for the terminal device, in a case that carrier aggregation (CA) is configured for the terminal device, group cells in which PDCCHs are monitored based on TRPs associated with the cells, to obtain at least two groups, where sequentially allocate search spaces of a first cell in each of the at least two groups in a fifth allocation sequence, where the first cell includes a primary cell PCell or a primary secondary cell PSCell in each group; and discard a first search space if a quantity of first monitoring objects that need to be monitored after the first search space is allocated exceeds the limit of the first monitoring objects that can be monitored by the terminal device, and discard a second search space if the second search space exists, where the first search space is any search space of the first cell, and the second search space is a search space that is in the search spaces of the first cell and that is allocated after the first search space.

Optionally, the processor 710 is further configured to:

allocate all search spaces of a secondary cell SCell in each of the at least two groups, where a configured quantity of first monitoring objects in a search space of the SCell does not exceed the limit of the first monitoring objects that can be monitored by the terminal device.

It should be understood that, in this embodiment of the present disclosure, the radio frequency unit 701 may be configured to receive and send information or a signal in a call process. Alternatively, after receiving downlink data from a base station, the radio frequency unit 701 sends the downlink data to the processor 710 for processing. In addition, the radio frequency unit 701 sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may communicate with a network and another device through a wireless communication system.

The terminal device provides wireless broadband Internet access for the user by using the network module 702, for example, helping the user to send and receive an e-mail, brows a web page, and access streaming media.

The audio output unit 703 may convert audio data received by the radio frequency unit 701 or the network module 702 or stored in the memory 709 into an audio signal and output the audio signal as a sound. In addition, the audio output unit 703 may further provide an audio output (for example, a call signal received voice, or a message received voice) related to a specific function implemented by the terminal device 700. The audio output unit 703 includes a speaker, a buzzer, a telephone receiver, and the like.

The input unit 704 is configured to receive an audio signal or a video signal. The input unit 704 may include a graphics processing unit (Graphics Processing Unit, GPU) 7041 and a microphone 7042, and the graphics processing unit 7041 processes image data of a still picture or video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive a sound and can process such sound into audio data. Processed audio data may be converted, in a call mode, into a format that can be sent to a mobile communication base station by using the radio frequency unit 701 for output.

The terminal device 700 further includes at least one sensor 705, such as an optical sensor, a motion sensor, and other sensors. Alternatively, the light sensor includes an ambient light sensor and a proximity sensor. The ambient light sensor may adjust luminance of the display panel 7061 based on brightness of ambient light. The proximity sensor may turn off the display panel 7061 and/or backlight when the terminal device 700 moves to an ear. As a type of the motion sensor, an accelerometer sensor may detect an acceleration value in each direction (generally, three axes), and detect a value and a direction of gravity when the accelerometer sensor is static, and may be used to recognize a posture of the terminal device (such as screen switching between landscape and portrait modes, a related game, or magnetometer posture calibration), a function related to vibration recognition (such as a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information entered by a user or information provided for a user. The display unit 706 may include a display panel 7061. The display panel 7061 may be configured in a form of a liquid crystal display (Liquid Crystal Display, LCD), an organic light-emitting diode (Organic Light-Emitting Diode, OLED), or the like.

The user input unit 707 may be configured to receive input digit or character information, and generate a key signal input related to a user setting and function control of the terminal device. Alternatively, the user input unit 707 includes a touch panel 7071 and another input device 7072. The touch panel 7071 is also referred to as a touchscreen, and may collect a touch operation performed by a user on or near the touch panel 7071 (such as an operation performed by a user on or near the touch panel 7071 by using any proper object or accessory, such as a finger or a stylus). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 710, and can receive and execute a command sent by the processor 710. In addition, the touch panel 7071 may be of a resistive type, a capacitive type, an infrared type, a surface acoustic wave type, or the like. The user input unit 707 may include another input device 7072 in addition to the touch panel 7071. Alternatively, the another input device 7072 may include but is not limited to a physical keyboard, a functional button (such as a volume control button or a power on/off button), a trackball, a mouse, and a joystick. Details are not described herein.

Further, the touch panel 7071 may cover the display panel 7061. When detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, although the touch panel 7071 and the display panel 7061 are used as two independent parts to implement input and output functions of the terminal device, in some embodiments, the touch panel 7071 and the display panel 7061 may be integrated to implement the input and output functions of the terminal device. This is not specifically limited herein.

The interface unit 708 is an interface for connecting an external apparatus with the terminal device 700. For example, the external apparatus may include a wired or wireless headphone port, an external power supply (or a battery charger) port, a wired or wireless data port, a storage card port, a port used to connect to an apparatus having an identity module, an audio input/output (Input/Output, I/O) port, a video I/O port, a headset port, and the like. The interface unit 708 may be configured to receive input (for example, data information and power) from an external apparatus and transmit the received input to one or more elements in the terminal device 700 or may be configured to transmit data between the terminal device 700 and an external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, and may further include a nonvolatile memory, for example, at least one magnetic disk storage device, a flash storage device, or another volatile solid-state storage device.

The processor 710 is a control center of the terminal device, is connected to each part of the entire terminal device by using various interfaces and lines, and performs various functions of the terminal device and data processing by running or executing the software program and/or the module that are/is stored in the memory 709 and invoking data stored in the memory 709, to perform overall monitoring on the terminal device. The processor 710 may include one or more processing units. Optionally, an application processor and a modem processor may be integrated into the processor 710. The application processor mainly processes an operating system, a user interface, an application program, and the like. The modem processor mainly processes wireless communications. It can be understood that, alternatively, the modem processor may not be integrated into the processor 710.

The terminal device 700 may further include the power supply 711 (such as a battery) that supplies power to each component. Optionally, the power supply 711 may be logically connected to the processor 710 by using a power supply management system, so as to implement functions such as charging and discharging management, and power consumption management by using the power supply management system.

In addition, the terminal device 700 includes some function modules not shown, and details are not described herein.

Optionally, an embodiment of the present disclosure further provides a terminal device, including a processor 710, a memory 709, and a computer program that is stored in the memory 709 and that can run on the processor 710. When the computer program is executed by the processor 710, the processes of the foregoing search space allocation method embodiment are implemented and a same technical effect can be achieved. To avoid repetition, details are not described herein again.

Figure 8:
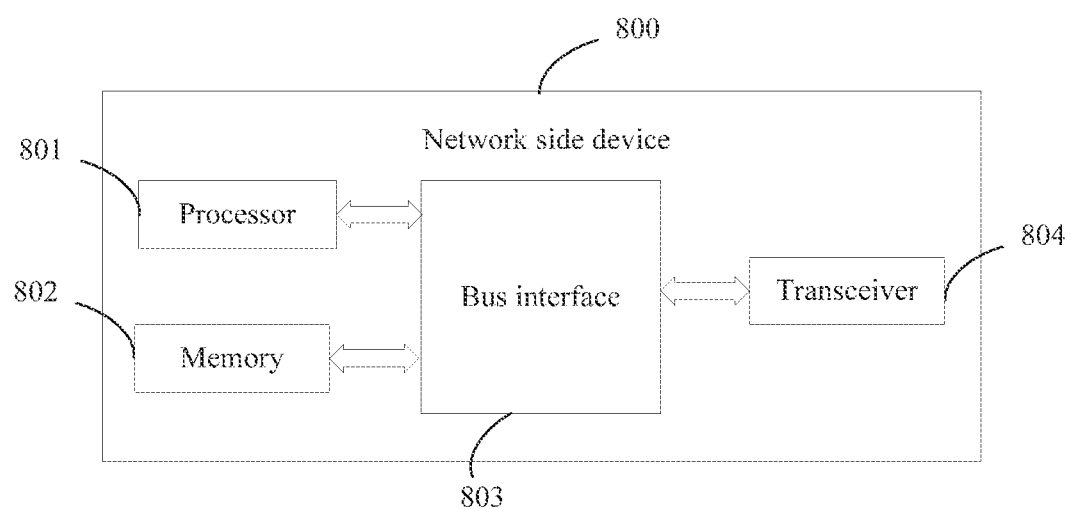
FIG. 8 is a structural diagram of a network side device according to still another embodiment of the present disclosure.

Referring to FIG. 8, FIG. 8 is a structural diagram of a network side device according to still another embodiment of the present disclosure. As shown in FIG. 8, a network side device 800 includes a processor 801, a memory 802, a bus interface 803, and a transceiver 804, where the processor 801, the memory 802, and the transceiver 804 are all connected to the bus interface 803.

In this embodiment of the present disclosure, the network side device 800 further includes a computer program that is stored in the memory 802 and that can run on the processor 801.

In this embodiment of the present disclosure, the transceiver 804 is configured to:

configure a search space set for a terminal device, where a transmission and reception point (TRP) is configured for the terminal device; and a quantity of first monitoring objects in the search space set does not exceed a limit of first monitoring objects that can be monitored by the terminal device, or a quantity of first monitoring objects in a search space associated with a second transmission object in the search space set does not exceed a limit of first monitoring objects that can be monitored by the terminal device, or a quantity of first monitoring objects in a search space associated with a secondary cell SCell in the search space set does not exceed a limit of first monitoring objects that can be monitored by the terminal device; and the first monitoring object includes a physical downlink control channel (PDCCH) candidate or a non-overlapping control channel element (CCE), the second transmission object includes a second TRP or a second control resource set (CORESET), the second TRP is a TRP other than a specific TRP in TRPs configured for the terminal device, the second CORESET is a CORESET other than a specific CORESET in a target CORESET, and the target CORESET is a CORESET configured for the terminal device to monitor a search space.

Optionally, the limit of the first monitoring objects that can be monitored by the terminal device includes at least one of the following:
  a TRP limit, where the TRP limit is a maximum quantity of first monitoring objects that are associated with one TRP in one cell and that can be monitored by the terminal device;
  a cell limit, where the cell limit is a maximum quantity of first monitoring objects that can be monitored by the terminal device in one cell;
  a carrier aggregation (CA) limit, where the CA limit is a maximum quantity of first monitoring objects that can be monitored by the terminal device in a case that CA is configured for the terminal device; or
  a group limit, where the group limit is a maximum quantity of first monitoring objects that can be monitored by the terminal device in one group, and the group is obtained by grouping cells in which PDCCHs are monitored based on TRPs.

Optionally, the specific TRP includes at least one of the following:
  a TRP associated with a common search space (CSS);
  a TRP associated with a specific downlink control information (DCI) format;
  a TRP associated with a specific identifier or a specific index; or
  a TRP indicated or configured by a network side device.

Optionally, the specific CORESET includes at least one of the following:
  a CORESET associated with a common search space (CSS);
  a CORESET associated with a specific downlink control information (DCI) format;
  a CORESET associated with a specific identifier or a specific index;
  a CORESET indicated or configured by a network side device; or
  a CORESET associated with a specific TRP.

Optionally, in a case that carrier aggregation (CA) is configured for the terminal device, the specific TRP is a TRP of a primary cell PCell or a primary secondary cell PSCell, and the specific CORESET is a CORESET of the PCell or the PSCell.

An embodiment of the present disclosure further provides a computer-readable storage medium. The computer-readable storage medium stores a computer program, and when the computer program is executed by a processor, the processes of the foregoing search space allocation method embodiment or the processes of the foregoing search space configuration method embodiment are implemented and a same technical effect can be achieved. To avoid repetition, details are not described herein again. The computer-readable storage medium includes a read-only memory (Read-Only Memory, ROM), a random access memory (Random Access Memory, RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

It can be understood that the embodiments described in the embodiments of the present disclosure may be implemented by hardware, software, firmware, middleware, microcode, or a combination thereof. For hardware implementation, a module, a unit, or a subunit may be implemented in one or more application specific integrated circuits (Application Specific Integrated Circuits, ASIC), digital signal processors (Digital Signal Processor, DSP), digital signal processing devices (DSP Device, DSPD), programmable logic devices (Programmable Logic Device, PLD), field-programmable gate arrays (Field-Programmable Gate Array, FPGA), general purpose processors, controllers, microcontrollers, microprocessors, or other electronic units or a combination thereof used to perform the functions in the present disclosure.

For software implementation, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A search space allocation method performed by a terminal device, comprising:
  in a case that a plurality of transmission and reception points (TRPs) is configured for the terminal device, discarding part of search spaces configured for the terminal device in a case that a quantity of first monitoring objects in a search space set configured for the terminal device exceeds a limit of first monitoring objects that can be monitored by the terminal device, wherein
  at least one first monitoring object comprises a physical downlink control channel (PDCCH) candidate or a non-overlapping control channel element (CCE);
  wherein the discarding part of search spaces configured for the terminal device comprises:
  discarding part or all UE-specific search spaces (USSs) associated with a first transmission object, wherein
  the first transmission object comprises a first control resource set (CORESET), and the first CORESET comprises at least one CORESET in CORESETs configured for the terminal device to monitor search spaces;
  wherein the first CORESET is a CORESET associated with a specific TRP among target CORESETs.

2. The method according to claim 1, wherein the first CORESET is a specific CORESET in a target CORESET;
  wherein the specific CORESET further comprises at least one of the following:
  a CORESET associated with a common search space (CSS);
  a CORESET associated with a specific downlink control information (DCI) format;
  a CORESET associated with a specific identifier or a specific index; or
  a CORESET indicated or configured by a network side device.

3. The method according to claim 2, wherein before the discarding part or all UE-specific search spaces (USSs) associated with a first transmission object, the method further comprises:
  allocating a common search space (CSS) configured for the terminal device; and
  the discarding part or all UE-specific search spaces (USSs) associated with a first transmission object comprises:
  sequentially allocating, in a first allocation sequence, USSs associated with the first transmission object; and
  discarding a first USS in a case that a quantity of first monitoring objects that need to be monitored after the first USS is allocated exceeds the limit of the first monitoring objects that can be monitored by the terminal device, and discarding a second USS in a case that the second USS exists, wherein
  the first USS is any USS associated with the first transmission object, and the second USS is a USS that is in the USSs associated with the first transmission object and that is allocated after the first USS.

4. The method according to claim 3, wherein a quantity of first monitoring objects in a search space allocated in a case that carrier aggregation (CA) is configured for the terminal device does not exceed a CA limit; and
  the CA limit is a maximum quantity of first monitoring objects that can be monitored by the terminal device in a case that CA is configured for the terminal device.

5. The method according to claim 2, further comprising:
  allocating all USSs associated with a second transmission object, wherein
  the second transmission object comprises a second CORESET, the second CORESET is a CORESET other than the first CORESET in the target CORESET, a configured first quantity does not exceed the limit of the first monitoring objects that can be monitored by the terminal device, and the first quantity is a quantity of first monitoring objects in USSs associated with the second transmission object.

6. The method according to claim 2, wherein before the discarding part or all UE-specific search spaces (USSs) associated with a first transmission object, the method further comprises:
  allocating a common search space (CSS) configured for the terminal device; and
  allocating all USSs associated with a third transmission object, wherein the third transmission object comprises a third CORESET, the third CORESET is a CORESET other than the first CORESET in the target CORESET, the target CORESET is a CORESET configured for the terminal device to monitor a search space, a configured second quantity does not exceed the limit of the first monitoring objects that can be monitored by the terminal device, and the second quantity is a quantity of first monitoring objects in USSs associated with the third transmission object; and
  the discarding part or all UE-specific search spaces (USSs) associated with a first transmission object comprises:
  sequentially allocating, in a second allocation sequence, USSs associated with the first transmission object; and
  discarding a third USS in a case that a quantity of first monitoring objects that need to be monitored after the third USS is allocated exceeds the limit of the first monitoring objects that can be monitored by the terminal device, and discarding a fourth USS if the fourth USS exists, wherein the third USS is any USS associated with the first transmission object, and the fourth USS is a USS that is in the USSs associated with the first transmission object and that is allocated after the third USS.

7. The method according to claim 1, wherein before the discarding part or all UE-specific search spaces (USSs) associated with a first transmission object, the method further comprises:
allocating a common search space (CSS) configured for the terminal device; and
the discarding part or all UE-specific search spaces (USSs) associated with a first transmission object comprises:
sequentially allocating, in a third allocation sequence, USSs associated with the plurality of TRPs configured for the terminal device; and
discarding a fifth USS in a case that a quantity of first monitoring objects that need to be monitored after the fifth USS is allocated exceeds the limit of the first monitoring objects that can be monitored by the terminal device, and discarding a sixth USS in a case that the sixth USS exists, wherein
the fifth USS is any USS associated with the plurality of TRPs configured for the terminal device, and the sixth USS is a USS that is in the USSs associated with the plurality of TRPs configured for the terminal device and that is allocated after the fifth USS.

8. A terminal device, comprising a processor, a memory, and a computer program that is stored in the memory and that can be run on the processor, wherein when the computer program is executed by the processor, the computer program implements:
in a case that a plurality of transmission and reception points (TRPs) is configured for the terminal device, discarding part of search spaces configured for the terminal device if a quantity of first monitoring objects in a search space set configured for the terminal device exceeds a limit of first monitoring objects that can be monitored by the terminal device, wherein
at least one first monitoring object comprises a physical downlink control channel (PDCCH) candidate or a non-overlapping control channel element (CCE);
wherein the discarding part of search spaces configured for the terminal device comprises:
discarding part or all UE-specific search spaces (USSs) associated with a first transmission object, wherein
the first transmission object comprises a first control resource set (CORESET), and the first CORESET comprises at least one CORESET in CORESETs configured for the terminal device to monitor search spaces;
wherein the first CORESET is a CORESET associated with a specific TRP among target CORESETs.

9. The terminal device according to claim 8, wherein the first CORESET is a specific CORESET in a target CORESET;
wherein the specific CORESET further comprises at least one of the following:
a CORESET associated with a common search space (CSS);
a CORESET associated with a specific downlink control information (DCI) format;
a CORESET associated with a specific identifier or a specific index; or
a CORESET indicated or configured by a network side device.

10. The terminal device according to claim 8, wherein when the computer program is executed by the processor, the computer program implements:
before the discarding part or all UE-specific search spaces (USSs) associated with a first transmission object, allocating a common search space (CSS) configured for the terminal device; and
the discarding part or all UE-specific search spaces (USSs) associated with a first transmission object comprises:
sequentially allocating, in a first allocation sequence, USSs associated with the first transmission object; and
discarding a first USS in a case that a quantity of first monitoring objects that need to be monitored after the first USS is allocated exceeds the limit of the first monitoring objects that can be monitored by the terminal device, and discarding a second USS in a case that the second USS exists, wherein
the first USS is any USS associated with the first transmission object, and the second USS is a USS that is in the USSs associated with the first transmission object and that is allocated after the first USS.

11. The terminal device according to claim 8, wherein when the computer program is executed by the processor, the computer program implements:
allocating all USSs associated with a second transmission object, wherein
the second transmission object comprises a second CORESET, the second CORESET is a CORESET other than the first CORESET in the target CORESET, a configured first quantity does not exceed the limit of the first monitoring objects that can be monitored by the terminal device, and the first quantity is a quantity of first monitoring objects in USSs associated with the second transmission object.

12. The terminal device according to claim 8, wherein a quantity of first monitoring objects in a search space allocated in a case that carrier aggregation (CA) is configured for the terminal device does not exceed a CA limit; and
the CA limit is a maximum quantity of first monitoring objects that can be monitored by the terminal device in a case that CA is configured for the terminal device.

13. The terminal device according to claim 8, wherein when the computer program is executed by the processor, the computer program implements:
before the discarding part or all UE-specific search spaces (USSs) associated with a first transmission object,
allocating a common search space (CSS) configured for the terminal device; and
allocating all USSs associated with a third transmission object, wherein the third transmission object comprises a third CORESET, the third CORESET is a CORESET other than the first CORESET in the target CORESET, the target CORESET is a CORESET configured for the terminal device to monitor a search space, a configured second quantity does not exceed the limit of the first monitoring objects that can be monitored by the terminal device, and the second quantity is a quantity of first monitoring objects in USSs associated with the third transmission object; and
the discarding part or all UE-specific search spaces (USSs) associated with a first transmission object comprises:
sequentially allocating, in a second allocation sequence, USSs associated with the first transmission object; and
discarding a third USS in a case that a quantity of first monitoring objects that need to be monitored after the third USS is allocated exceeds the limit of the first monitoring objects that can be monitored by the terminal device, and discarding a fourth USS in a case that the fourth USS exists, wherein the third USS is any USS associated with the first transmission object, and the fourth USS is a USS that is in the USSs associated with the first transmission object and that is allocated after the third USS.

14. The terminal device according to claim 8, wherein when the computer program is executed by the processor, the computer program implements:
    before the discarding part or all UE-specific search spaces (USSs) associated with a first transmission object, allocating a common search space (CSS) configured for the terminal device; and
    the discarding part or all UE-specific search spaces (USSs) associated with a first transmission object comprises:
    sequentially allocating, in a third allocation sequence, USSs associated with the plurality of TRPs configured for the terminal device; and
    discarding a fifth USS in a case that a quantity of first monitoring objects that need to be monitored after the fifth USS is allocated exceeds the limit of the first monitoring objects that can be monitored by the terminal device, and discarding a sixth USS in a case that the sixth USS exists, wherein
    the fifth USS is any USS associated with the plurality of TRPs configured for the terminal device, and the sixth USS is a USS that is in the USSs associated with the plurality of TRPs configured for the terminal device and that is allocated after the fifth USS.

15. A network side device, comprising a processor, a memory, and a computer program that is stored in the memory and that can be run on the processor, wherein when the computer program is executed by the processor, the computer program implements:
    configuring a search space set for a terminal device, wherein
    a plurality of transmission and reception points (TRPs) is configured for the terminal device; and a quantity of first monitoring objects in the search space set does not exceed a limit of first monitoring objects that can be monitored by the terminal device, or
    a quantity of first monitoring objects in a search space associated with a second transmission object in the search space set does not exceed a limit of first monitoring objects that can be monitored by the terminal device, the second transmission object comprises a second TRP or a second control resource set (CORESET), the second TRP is a TRP other than a specific TRP in the plurality of TRPs configured for the terminal device, the second CORESET is a CORESET other than a specific CORESET in a target CORESET, and the target CORESET is a CORESET configured for the terminal device to monitor a search space, or
    a quantity of first monitoring objects in a search space associated with a secondary cell SCell in the search space set does not exceed a limit of first monitoring objects that can be monitored by the terminal device; and
    at least one first monitoring object comprises a physical downlink control channel (PDCCH) candidate or a non-overlapping control channel element (CCE),
    wherein the limit of the first monitoring objects that can be monitored by the terminal device comprises at least one of the following:
    a TRP limit, wherein the TRP limit is a maximum quantity of first monitoring objects that are associated with one TRP in one cell and that can be monitored by the terminal device;
    a cell limit, wherein the cell limit is a maximum quantity of first monitoring objects that can be monitored by the terminal device in one cell;
    a carrier aggregation (CA) limit, wherein the CA limit is a maximum quantity of first monitoring objects that can be monitored by the terminal device in a case that CA is configured for the terminal device; or
    a group limit, wherein the group limit is a maximum quantity of first monitoring objects that can be monitored by the terminal device in one group, and the group is obtained by grouping cells in which PDCCHs are monitored based on TRPs.

16. The network side device according to claim 15, wherein the specific TRP comprises at least one of the following:
    a TRP associated with a common search space (CSS);
    a TRP associated with a specific downlink control information (DCI) format;
    a TRP associated with a specific identifier or a specific index; or
    a TRP indicated or configured by a network side device;
    wherein the specific CORESET comprises at least one of the following:
    a CORESET associated with a common search space (CSS);
    a CORESET associated with a specific downlink control information (DCI) format;
    a CORESET associated with a specific identifier or a specific index;
    a CORESET indicated or configured by a network side device; or
    a CORESET associated with a specific TRP.

17. The network side device according to claim 15, wherein in a case that carrier aggregation (CA) is configured for the terminal device, the specific TRP is a TRP of a primary cell PCell or a primary secondary cell PSCell, and the specific CORESET is a CORESET of the PCell or the PSCell.

* * * * *